US011663267B2

(12) United States Patent
Lidaka et al.

(10) Patent No.: US 11,663,267 B2
(45) Date of Patent: May 30, 2023

(54) SYSTEMS AND METHODS FOR LEVERAGING METADATA FOR CROSS PRODUCT PLAYLIST ADDITION VIA VOICE CONTROL

(71) Applicant: Rovi Guides, Inc., San Jose, CA (US)

(72) Inventors: Christopher Lidaka, Apex, NC (US); Peter Jason Calvert, Limerick, PA (US)

(73) Assignee: Rovi Guides, Inc., San Jose, CA (US)

( * ) Notice: Subject to any disclaimer, the term of this patent is extended or adjusted under 35 U.S.C. 154(b) by 306 days.

(21) Appl. No.: 16/941,330

(22) Filed: Jul. 28, 2020

(65) Prior Publication Data

US 2022/0035859 A1 Feb. 3, 2022

(51) Int. Cl.
| | |
|---|---|
| G06F 16/687 | (2019.01) |
| G06F 16/638 | (2019.01) |
| G10L 15/22 | (2006.01) |
| G10L 15/18 | (2013.01) |
| G06F 16/68 | (2019.01) |
| G06F 21/10 | (2013.01) |
| G06F 3/16 | (2006.01) |
| G10L 15/08 | (2006.01) |

(52) U.S. Cl.
CPC ............ *G06F 16/639* (2019.01); *G06F 3/165* (2013.01); *G06F 16/686* (2019.01); *G06F 16/687* (2019.01); *G06F 21/10* (2013.01); *G10L 15/1822* (2013.01); *G10L 15/22* (2013.01); *G10L 2015/088* (2013.01); *G10L 2015/223* (2013.01)

(58) Field of Classification Search
CPC ................. G06F 16/60–687; G06F 3/165–167
See application file for complete search history.

(56) References Cited

U.S. PATENT DOCUMENTS

| 2009/0063627 A1* | 3/2009 | Nowacek | G06F 16/68 709/203 |
| 2009/0076821 A1* | 3/2009 | Brenner | G06F 16/64 707/999.001 |
| 2016/0055245 A1* | 2/2016 | Hoarty | G10L 15/08 707/770 |

\* cited by examiner

*Primary Examiner* — Robert W Beausoliel, Jr.
*Assistant Examiner* — Nirav K Khakhar
(74) *Attorney, Agent, or Firm* — Haley Guiliano LLP

(57) ABSTRACT

Systems and methods for generating a playlist of audio content for a vehicle are disclosed. An audio input is received at a vehicle entertainment system of the vehicle while an audio content item is currently played by the vehicle entertainment system. The audio input includes an audio command trigger and an audio playlist command. In response to detecting the audio command trigger in the audio input, the audio input is parsed to determine the audio playlist command. A metadata associated with the audio content item is determined. In response to determining the audio playlist command, the audio content item is caused to be added to an audio content playlist of a third-party service based on the metadata of the audio content item.

16 Claims, 9 Drawing Sheets

SYSTEMS AND METHODS FOR LEVERAGING METADATA FOR CROSS PRODUCT PLAYLIST ADDITION VIA VOICE CONTROL

BACKGROUND

The present disclosure relates to in-vehicle on-demand audio signal processing and, more particularly, to systems and methods related to in-vehicle command-based audio content management techniques.

SUMMARY

At the fingertip of the internet user lies a web of interwoven infrastructure nearly single-handedly responsible for transforming our modern-day living from online shopping to digital interactions to content streaming, just to name a few examples. The internet was initially brought to the office of the consumer, then to the residence of the consumer, and more recently it is trending to the vehicle of the consumer with formidable contributions such as guiding self-driving vehicles, tooling onboard navigation systems, and enabling internet-based media entertainment. The driver of a self-driving car is provided with real-time, internet-guided auto-steering mechanisms for promoting a handsfree driving experience. The driver of a conventional vehicle is provided with mobile, real-time, and easy access to an internet-based navigational guidance system for locating a desired destination location. The driver of an internet-ready vehicle, self-driving or not, is provided with selective access to internet-based radio broadcast channels for a customized audio content-streaming experience.

Taking the example of a vehicular internet audio-streaming feature, certain application programming interfaces (APIs) are specifically tailored to provide riders with internet-based or terrestrially provided music choices by connecting the vehicle to online music stations or terrestrial-broadcast radio stations through an intermediary vehicle entertainment device. The Apple-manufactured Car Play is an example application that, when executed, causes the projection of a user's smart device screen display onto the vehicle entertainment device screen display bringing the digital audio experience to the internet-ready vehicle. The driver or passenger can select between various types of streamed audio content, such as podcasts, eBooks, and music but only when connected, wirelessly or with wire, to an application executing on and externally located to the vehicle entertainment device, such as the smart device. Another available vehicle-specific API, Gracenote, provides audio-related information display supplementing the rider's driving experience with audio content data. Neither application is without consumer service-providing limitations. In both scenarios, the consumer experience is lacking in the absence of a seamless vehicle-to-internet direct audio coupling. The Car Play option falls short of offering an integrated audio content-streaming service, and the Gracenote option, largely focused on song, song title, and artist recognition features, offers little by way of an in-vehicle audio content play processing. Add to that manually driven search entry and application installation and updating, and the user experience is dramatically diminished.

A fully integrated and seamless internet-based vehicular entertainment system, with no external smart device prerequisite, provides a nearly opposite experience, one that is user enhanced. In disclosed embodiments, a vehicle entertainment system includes a fully integrated audio-streaming and processing service, imparting to the user an application-free and internet-based entertainment experience. The user can selectively activate an internet- or terrestrial-sourced audio-streaming service with on-demand, command-driven, and real-time audio playlist-building capabilities. In some cases, a driver or a vehicle passenger can enjoy a handsfree, automated playlist processing service in the car. While listening to terrestrial broadcast or internet-based audio, the rider selectively commands, with a short utterance, transferring an audio content item, an audio content identifier, or both to a remote third-party service, such as Spotify, Pandora, or other audio services, for playlist building.

In accordance with various embodiments, a method of automatically generating a playlist of audio content from a vehicle is disclosed. A vehicle entertainment system of the vehicle receives an audio input including an audio command trigger and an audio playlist command. For example, the vehicle entertainment system may receive an audio input, "TIVO, add this song to my Spotify playlist," that includes an audio command trigger, "TIVO" and an audio playlist command, "add this song to my Spotify playlist." In response to detecting the audio command trigger in the audio input, the vehicle entertainment system parses the audio playlist command to extract a third-party provider identification (e.g., Spotify). The system determines an item of metadata of an audio content item that identifies an audio content item currently playing on the vehicle entertainment system of the vehicle. Various information may be extracted from the metadata regarding the currently playing audio content item on the vehicle entertainment system, for example, the audio content item's title (e.g., the song "Dream On)", the artist (e.g., Aerosmith), and various other audio content-related data. In accordance with the audio playlist command, identification of the audio content item (e.g., the song "Dream On",) and related information are subsequently bundled into a proxy file and transmitted by the vehicle entertainment system to a third-party server of the user-specified third-party service for adding the audio content item identified in the proxy file to a user audio content playlist. In some cases, the third-party service may be extracted from the audio playlist command of the audio input.

The audio input may be received while the audio content item is played by the vehicle entertainment system. For example, the song, "Dream On" may be playing in the car when the vehicle entertainment system receives the audio input "TIVO, add this song to my Spotify playlist." Similarly, the audio command trigger may be detected while the audio content item is playing in the vehicle. For example, the audio trigger "TIVO" may be detected while the vehicle entertainment system plays the song "Dream On."

In some embodiments, at least a part of the metadata may require translation to a metadata recognizable third-party service provider. For example, the metadata of the currently playing audio content item may include an identification unique and recognizable to TIVO (e.g., audio content identifier) yet foreign and unrecognizable to Spotify. In this case, the system performs a translation operation to convert the TIVO-recognizable identification—audio content identifier—to a Spotify-recognizable identification—third-party content identifier—to ensure proper identification of the audio content item of interest in the proxy file to the third-party recipient, Spotify. In some embodiments, the audio content identifier may be a song identification, a key specifying a third-party playlist service, for example, Spotify, a playlist parameter, or a combination thereof.

In some embodiments, the vehicle entertainment system may build or edit the audio content playlist without resorting to a third-party service, based on the audio playlist command. In this case, the vehicle entertainment system and the third-party service may perform playlist-related operations such as maintaining, building and editing the audio content playlist.

Whether the audio content playlist is third-party-generated or in-vehicle generated, the audio content playlist may be based on an audio content category. For example, the playlist may be organized by artist or genre. The audio content item or an identifier of the audio content item may be transmitted to a remote third-party server affiliated with the third-party service. In some cases, the audio content item, an audio content identifier, or a combination, of the audio content playlist may be saved in a database, remotely located from the vehicle, and may be transmitted from the database to the remote third-party service under the control of the vehicle entertainment system for building or editing the playlist. The audio content item may be sourced by an internet network device, or it may be terrestrially sourced, both remotely and externally located to the vehicle. For example, the song "Dream On" may be received from the server of an internet radio station or it may be received from a frequency modulated (FM) radio station.

In some cases, the database stores and maintains audio content (or identifiers of audio content) for audio content playlists. For example, audio content identifiers, transmitted by the vehicle entertainment system, may be stored and categorized for subsequent transmission to a third-party server of the third-party service. Upon receipt of the stored information, the third-party server may construct or edit the playlist and transmit the constructed or edited playlist back to the database or the vehicle entertainment system. In some cases, the database may store playlist content or content identifies from more than one source. For example, the database may collect user-identified audio content identifiers of audio content from various audio content sources for building a playlist from the collected audio content. The multi-sourced audio content may be from a user home device, a user office device, and the user vehicle entertainment device; the collective sum of all identified content may ultimately become the subject of a user playlist under construction. That is, the collected identified content may be transmitted to a third-party service for building or modifying the user playlist of audio content, including a combination of the collected identified content and the content identified by the user vehicle entertainment system for subsequent transmission to a third-party service to build or modify a user playlist. A third-party server affiliated with the third-party service may be directed to transmit the built or edited playlist to the vehicle entertainment system, the database, or another destination device or system.

In some embodiments, detecting the audio command trigger indicates to the vehicle entertainment system to perform an action related to one or more audio content items vis-a-vis one or more audio content playlists. For example, the audio command "TIVO" may be indicative of taking an audio playlist action to add or even to remove a song from a user playlist.

The audio content identifier in the metadata may be translated to a third-party audio content identifier based on a protocol. With continued reference to the above example, the audio content identifier may need translation to an identifier recognizable to Spotify for adding the song "Dream On" to a corresponding user playlist, in accordance with a Spotify-specific protocol. The audio content identifier uniquely identifies the audio content to the vehicle entertainment system, and the third-party audio content identifier uniquely identifies the audio content and in some cases, the audio content playlist corresponding to the audio content, to a remote server (e.g., a Spotify-affiliated server) for inclusion of the audio content item in the audio content playlist. The third-party audio content identifier is then transmitted by the vehicle entertainment system to the remote third-party server for adding the audio content item to the audio content playlist.

A third-party audio content identifier and the audio content identifier each identify audio content for inclusion in corresponding audio content playlists that may or may not be based on audio content categories. In some cases, an audio content identifier or a third-party audio content identifier may be a song identification, a key, a playlist parameter, or some combination thereof. It is understood that the foregoing identifier examples are not all-encompassing and that identifiers, for playlists or otherwise, may suitably carry other types of information relating to audio content and audio content-related information, such as, without limitation, audio content playlists.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The present disclosure is, in some embodiments, directed to methods and systems for in-vehicle audio playlist generation, processing, and maintenance, and more particularly to in-vehicle voice command-triggered audio playlist generation and editing techniques.

Figure 1:
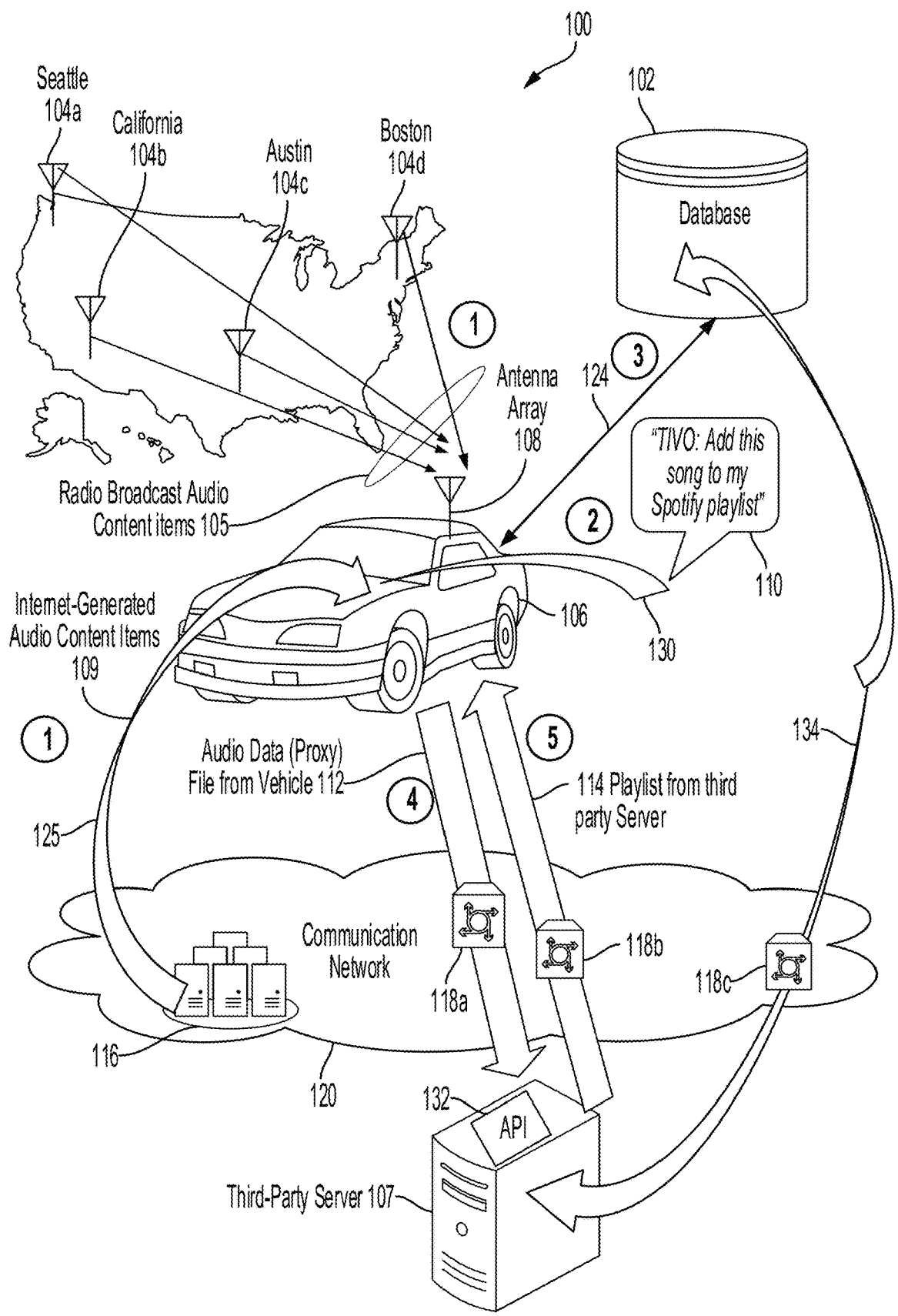
FIGS. 1-2 each show an illustrative diagram of an audio playlist generation system, in accordance with some embodiments of the disclosure.

FIG. 1 shows an illustrative diagram of an exemplary audio playlist generation system 100, in accordance with some embodiments of the disclosure. In some embodiments, system 100 performs on-demand vehicle-commanded audio playlist generation, processing, management, and maintenance based on audio content items played and displayed in the vehicle and sourced from one or more audio content types. The system is voice command-triggered to perform certain audio playlist actions based on one or more audio content types from one or more variety of audio content sources (e.g., terrestrial, internet) and geographical origins available to a user or occupant of a vehicle.

In one embodiment, as shown in FIG. 1, a system 100 includes an array 104 of antennas (104a, 104b, 104c, 104d ... 104n, "n" being an integer value), a vehicle 106 with antenna array 108 and including a vehicle entertainment system 110, a third-party server 107, a database 102, and a communication network 120. Vehicle 106 with antenna array 108 and vehicle entertainment system 110 may comprise an audio playlist generation system, such as without limitation, vehicle entertainment system 110 of various disclosed embodiments. Vehicle entertainment system 110 may comprise an audio playlist generation system in various embodiments.

While an array 104 of a specific number of antennas (104a-104d), located in various geographical regions (e.g., Seattle, California, Austin, and Boston, respectively) is shown in FIG. 1 and described herein, it is understood that array 104 may include a different number of (up to n) antennas dispersed in various geographical regions. In some embodiments, some or all of the antennas of array 104 are collectively located in a single region. In some embodiments, broadcast-generated (terrestrial-generated) audio content items 105 may be broadcast from various locations around the entire country. In some embodiments, internet-generated audio content items 109 may be received from one or more audio content-producing internet devices. For both the broadcast- and internet-sourced content items, selection of audio content items is a matter of a user selection or based on a machine-selection model. In the former case, for example, a driver or occupant of vehicle 106 may select a broadcast radio station or an internet-based station for in-vehicle listening pleasure. Additionally, or alternatively, a machine-learning model may be trained with training data representing user (e.g., a registered owner or regular driver of vehicle 106)-selected broadcast and internet station and channel selections over time. The trained model may then become the source of in-vehicle broadcast and internet radio station and channel selection for a user handsfree experience, a particularly useful feature of an autonomous vehicle.

Vehicle 106 may be a passenger car, a truck, a bus, or a minivan. Vehicle 106 may be any vehicle type capable of human transportation, equipped with an on-board entertainment system and internet-ready. In some embodiments, vehicle 106 may be autonomous, but vehicle 106 need not be self-driving and may be a conventional vehicle requiring manual guidance by a human driver. Vehicle 106 may be a hybrid vehicle, for example, a semi self-driving vehicle with some but not all driving features automated. For example, vehicle 106 may be equipped with automated lane-changing mechanisms but manual steering features.

Each of the antennas (104a, 104b, 104c, 104d ... 104n) of array 104 may be a broadcast receiving antenna and a broadcast-transmitting antenna. For example, each of the antennas of array 104 may be an omnidirectional antenna suitable for transmitting and receiving broadcast signals. According to an embodiment, array 104 may communicate over one or more wireless networks that operate according to a 5G specification or standard. In some embodiments, the wireless network includes one or more wireless networks that operate according to a specification or a standard other than a 5G specification or standard. For example, the wireless network may operate as a 3G network, a 4G network, an LTE network, an LTE-Advanced (LTE-A) network, a Global System for Mobile Communications (GSM) network, a Code Division Multiple Access (CDMA) network, a Wideband Code Division Multiple Access (WCDMA) network, an Ultra Mobile Broadband (UMB) network, a High-Speed Packet Access (HSPA) network, an Evolution Data Optimized (EV-DO) network, a Universal Mobile Telecommunications System (UMTS) network, or some other type of wireless network (e.g., an ad hoc network, a non-land-based wireless network, etc.). According to an exemplary implementation, a wireless network includes a radio access network (RAN) and a core network.

In some embodiments, vehicle 106 receives broadcast audio content items 105 through a vehicle antenna 108 positioned on vehicle 106. Antenna 108 may be positioned at any location externally or internally to the vehicle that is suitable for transmitting and receiving broadcast signals of audio content items detectable by vehicle 106, to and from array 104, respectively. In the embodiment of FIG. 1, antenna 108 is shown positioned on a top surface (e.g., roof) of vehicle 106, but antenna 108 need not be positioned as shown in FIG. 1.

In some embodiments, vehicle 106 may receive broadcast audio content items 105 indirectly. For example, vehicle 106 may receive audio content from database 102. In such cases, database 102 requires an antenna or another type of a receiving and transmitting mechanism for communicating with vehicle 106. Database 102 can store all or some received or broadcast audio, content items from the broadcast content sources. Database 102 may analogously store all received internet-generated audio content items 109 from internet-generating audio sources. For example, database 102 may receive broadcast audio content items 105 from the antennas of array 104 and store the received broadcast content items in a storage local or externally coupled to database 102. Similarly, database 102 may receive and store audio content items 109. In the case of broadcast audio content items (e.g., audio content items 105), while not shown in FIG. 1, database 102 may include the broadcast audio content items 105, or database 102 may be coupled to transmit and receive audio signals the broadcast audio content items 105. Analogously, database 102 may receive internet-generated audio content items 109 from communication network 120 and store the received content items in a storage local or externally coupled to database 102. In such cases, while not shown in FIG. 1, database 102 may include the broadcast audio content items 105, or database 102 may be coupled to transmit and receive audio signals representing the broadcast audio content items 105 and internet-generated audio content items 109. Database 102 can include a server or a collection of servers designed to receive and store the broadcast audio content items and the internet-generated audio content items. Broadcast content sources, for example, from California via antenna 104b, can include over-the-air digital signals or over-the-air analog signals. In some embodiments, system 100 may convert over-the-air, analog, or digital signals to MPEG or MP3 (audio) signals for storage and processing. For example, vehicle 106 may convert over-the-air or analog signals, transmitted from array 104 or communication network 120, to MPEG or MP3 signals, and MP3 signals may be used to carry audio signals with audio content of audio content items subsequently the subject of an in-vehicle and user-specified audio playlist. In some embodiments, vehicle entertainment system 110 converts, at least in part, over-the-air, analog, or digital signals to MPEG or MP3 signals.

Vehicle 106 includes a vehicle entertainment system 110 configured to process, construct, and in some cases maintain, audio playlists based on a user selection of an audio content item. In some embodiments, vehicle 106 receives an audio input at vehicle entertainment system 110. Vehicle 106 may be listening for an audio command trigger while receiving an audio input. Vehicle 106 may receive an audio input while an audio content item is currently played by the vehicle entertainment system (e.g., the song "Dream On" by the band Aerosmith). The audio content item may be terrestrially sourced—broadcast audio content received from array 104—or internet-sourced—internet-generated audio content from communication network 120. The audio input includes an audio command trigger and an audio playlist command. In response to detecting the audio command trigger in the audio input, vehicle entertainment system 110 parses the audio input to determine the audio playlist command. In some embodiments, the audio playlist command is a user (e.g., driver or occupant of vehicle 106) command, a commanded action on a user-specified audio playlist (e.g., "Add this song to my Spotify playlist" or "Generate a playlist of the same genre on Spotify"). In response to detecting the audio command trigger, vehicle entertainment system 110 may determine a metadata associated with the audio content item of the audio content playing in vehicle 106 and, in response to determining the audio playlist command, vehicle entertainment system 110 may cause the audio content item to be added to an audio content playlist of a third-party service based on the metadata of the audio content item.

With continued reference to FIG. 1, database 102 may be a relational database, NoSQL, or object-oriented database. Database 102 may be any database or storage space (e.g., persistent or non-persistent storage) suitably configurable for housing audio content—and audio content identifiers—information related to audio content, as shown and discussed herein. In some embodiments, database 102 includes one or more database devices, which may be of a common database type, such as, without limitation, one or more relational databases, or of differing database types, such as, without limitation, one or more relational and one or more object-oriented database types.

In FIG. 1, database 102 and other systems may be communicatively coupled through communication network 120. In the embodiment of FIG. 1, database 102 and server 107 are shown communicatively coupled through communication network 120. Specifically, database 102 and server 107 are shown communicatively coupled through interface 134 to communication network 120 for facilitating the exchange of audio content and audio content identifier information for use by vehicle entertainment system 110. Database 102 and communication network 120 may be communicatively coupled wirelessly or with wire. In some embodiments, database 102 may be coupled directly or indirectly, wirelessly, to vehicle entertainment system 110. Similarly, server 107 and communication network 120 may be communicatively coupled wirelessly or wired. In some embodiments, server 107 may be coupled directly or indirectly, and wirelessly, to vehicle entertainment system 110 through interfaces 112 and 114 of communication network 120. In the embodiment of FIG. 1, database 102 and vehicle entertainment system 110 are shown coupled through an interface 124. Database 102 may be wirelessly communicatively coupled to vehicle entertainment system 110 for housing audio content items and audio content identifier information for the ultimate building or editing of an audio playlist, as disclosed herein. In some embodiments, database 102 and vehicle entertainment system 110 communicate through interface 125 of communication network 120, as further discussed below. In some embodiments, system 100 does not include database 102. In such an embodiment, the relevant functions of database 102 may be performed, at least in part, by vehicle entertainment system 110 or a combination of vehicle entertainment system 110, communication network 120, and server 107. In an example implementation, database 102 may be a physically local storage device or storage space that is in part or in whole incorporated into vehicle entertainment system 110 or an electronic device of vehicle 106 other than and communicatively coupled to vehicle entertainment system 110.

In some embodiments, such as shown in the embodiment of FIG. 1, database 102 is organized into storage spaces for housing a combination of user profile items, audio content, audio content identifiers or other audio content-related information. User profile items may include user-favorite audio content items, for example, based on historical user selections, and/or other user-specific information. Database 102 may further house user audio playlist selections and machine learning-based audio playlist selections, as further discussed below.

Third-party server 107 may be a database or other storage types such as discussed above relative to database 102. Server 107 may be a networking device affiliated with a third-party audio content management service (e.g., Spotify, Pandora) for building audio playlists pursuant to requests from vehicle entertainment system 110. For example, server 107 may receive a request through interface 112, from vehicle entertainment service 110, to add an audio content item to an existing user playlist (e.g., one of a particular genre) or to build a new playlist based on the audio content item, for example. In some embodiments, vehicle entertainment system 110 is equipped to communicate with an application programming interface (API) 132 of server 107 to effect user-commanded playlist actions. For example, vehicle entertainment system 110 may store JavaScript Object Notation (JSON)-formatted code that when executed by a processor of, coupled to, or accessed by vehicle entertainment system 110 causes an content item played in-vehicle (e.g., the song "Dream On") to be added to a user playlist by server 107. Vehicle entertainment system 110 may transmit a request to add an audio content item to an existing or new playlist through interface 112 and communication network 120 and may, in return, receive an updated or newly constructed playlist from server 107 through interface 114 and communication network 120. In some cases, vehicle entertainment system 110 may construct or update a playlist without, or in addition to, resorting to server 107. Vehicle entertainment system 110 and server 107 may exchange other types of information, as further discussed herein. Server 107 may be located internally or externally to a network cloud. For example, server 107 may be a part of communication network 120 or externally located and communicatively coupled to communication network 120, as shown in the embodiment of FIG. 1. Server 107 may be any networking or storage device with the capability to communicate and acknowledge requests from vehicle entertainment system 110 and to generate, update, and process audio playlists on-demand.

In some embodiments, the JSON code includes metadata associated with a TiVo entertainment system, such as vehicle entertainment system 110 of FIG. 1, or TiVo in general. For example, a TiVo entertainment system implemented in an internet-connected car, such as vehicle 106 of FIG. 1, can use JSON code to program the metadata associated with a song that is playing in vehicle 106. For example, the TiVo entertainment system may be programmed with the following raw JSON code:

{"status":"ok", "code":200, "messages":null,"build":"1.0", "parameters": {"apiKey": "crw5myhx6caazcmsky56ud9s", "id": "Dream On", "include": "all", "format": "json", "country": "US", "language": "en"}, "serverName": "tul1csprcs6.corporate.local", "startTime": "2020-04-26T19:20; 54Z", "duration": 135, "song":{"ids": {"amgClassicalTrackId": null, "amgPopTrackId": "T841898", "irscId": "US SM10011897", "muzeID": "2750616", "trackID": "MT0008867553"}, "title": "Dream On", "primaryArtists":[{"id": "MN0006048252", "name">"Aerosmith"}], "isPick":true, "genres":[{"id": "MA0000002613", "name": "Pop/Rock", "weight":8}], "attributes":null, "attributesUri":null, "appearances": [{"ids":{albumId": "MW0002654019", "released": "MR0005179349", "trackId": "MT0057453193"}, "title": "Live Rock Songs", "label": "Universal", "year": " ", "rating":0, "isPick":false, "hasReview":false, "sample": " ", "sonySample": false, "duration":291}, {"ids":{"albumId": "MW0000318767", "released": "MR0000270828", "trackId": "MT0008271885"{, "title": "Metalmania", "label": "Columbia", "year": " ", "rating":5, "isPick":false, "hasReview":false, "sample": " ", "sonySample":false, "duration":0}, {"ids":{"albumId": "MW0002189526", "released": "MR0003416489", "trackId": "MT0042070145"}, "title":"Permanent Rock: Live In Boston", "label": "Access All Areas/Intergroove", "year": " ", "rating":0, "isPick":false, "hasReview":false, "sample": " ", "sonySample":false, "duration":}, {"ids":{"albumId": "MW0002891688", "released": "MR0004482166", "trackId": "MT0052840681"}, "title": "Rockin' Roots of Aerosmith", "label": "Laser The above JSON code may be represented in a user-friendly format as follows:

JSON
   status: ok
   code: 200
   messages: null
   build: 1.0
   parameters
   apiKey: crw5myhx6caazcmsky56ud9s
   id: Dream On
   include: all
   format: json
   country: US
   language: en
   serverName: tul1csprcs6.corporate.local
   startTime: 2020-04-26T19:30:547
   endTime: 2020-04-26T21:35:547
   duration: 135
   song
   ids
     amgClassicalTrackId: null
     amgPopTrackID: T 841898
     isrcId: USSM10011897
     muzeId: 2750616
     trackId: MT0008867553
   title: Dream On
   primaryArtist
     0
        id: MN0000604852
        name: Aerosmith
   isPick: true
   genres
     0
        id: MA0000002613
        name: Pop/Rock
        weight: 8
   attributes: null
   attributesUri: null
   appearances
   appearancesUri: http://rcs.rovicorp.com/v1.1/song/appearances?format=json&apikey=crw5myhx6caazcmsky-56ud9s&trackId=MT0008867553&allowsmeclip=false The above JSON code may identify the audio content identifier—the identifier for the song "Dream On"—with the "apiKey" parameter or the "trackid". In the same code, the playlist genre may be indicated as "Pop/Rock". For example, vehicle entertainment system 110 may create a playlist of audio content items, including the song "Dream On" by the band Aerosmith, of the pop/rock genre.

Vehicle entertainment system 110 of vehicle 106 may be coupled to one or more remaining electrically powered automobile devices or a central electronic back panel device communicatively coupling various electronic devices, including vehicle entertainment system 110, to each other. In some embodiments, vehicle entertainment system 110 is communicatively coupled to other in-vehicle devices of vehicle 106 through an interface 130. Interface 130 may be a wired or wireless interface. In some embodiments, communication of audio content, audio content identifier, and audio input between vehicle entertainment system 110 and other devices (e.g., database 102, server 107, communication network 120) may be facilitated through interface 130 using a wired connection, such as an audio cable, USB cable, ethernet cable or the like attached to a corresponding input port, or may be accomplished using a wireless connection, such as through Bluetooth, WIFI, WiMAX, GSM, UTMS, CDMA, TDMA, 3G, 4G, 5G, Li-Fi, LTE, or any other suitable wireless transmission protocol.

Vehicle entertainment system 110 of vehicle 106 may include an audio transceiver with the capability to transmit, receive, and process audio signals, such as, without limitation, audio content items transmitted through audio content-related signals for building audio playlists. The audio transceiver may be used for transmitting and receiving message-carrying signals, such as, without limitation, audio playlist build or edit commands, communicated between server 107 and database 102, for example. Alternatively, an audio receiver located externally and coupled to vehicle entertainment system 110 and positioned internally to vehicle 106, may serve as an audio signal transceiver for receiving and transmitting audio signals from and to vehicle entertainment system 110.

In some embodiments, vehicle entertainment system 110 can present and play a selection of audio content for generating or editing an audio playlist, in some cases via a user interface (an example of which is shown and discussed relative to FIG. 2), based on user selections. Vehicle entertainment system 110 may receive broadcast-sourced audio signals from array 104 via antenna array 108, and internet-sourced signals from communication network 120. Vehicle entertainment system 110 may request third-party server 107 to generate an audio playlist based on a user voice command-triggered selection from the received broadcast and/or internet-based audio content. In some embodiments, vehicle entertainment system 110 may transmit identifying information and possibly other types of information relating to a selected audio content to third-party server 107 of a third-party audio service provider for generating an audio playlist based on the selection from the received broadcast sources from array 104 or internet sources.

Communication network 120 may be a wide area network (WAN), a local area network (LAN), or any other suitable network system. Communication network 120 may include one or more network systems. For example, communication network 120 may include a WAN and a LAN, two or more LANs, two or more WANs, or a combination thereof. In some embodiments, communication network 120 and vehicle entertainment system 110 are communicatively coupled through one or more network communication interfaces. For example, communication network 120 and vehicle entertainment system 110 may be communicatively coupled through interfaces 112, 114, and 125, as shown in FIG. 1. Communication network 120 and vehicle entertainment system 110 may be communicatively coupled wirelessly. In some example implementations, communication network 120 and vehicle entertainment system 110 may be communicatively coupled through the interfaces shown and discussed relative to FIGS. 5-7 herein. In some embodiments, communication network 120 and vehicle entertainment system 110 may be communicatively coupled in accordance with one or more suitable network communication interfaces not necessarily shown and discussed herein.

Communication network 120 generally includes various networking infrastructures supporting network traffic transmission. In the embodiment of FIG. 1, communication network 120 is shown to include a server farm 116 and communication servers 118 (118a, 118b, and 118c) for facilitating internet communication between vehicle entertainment system 106 and third-party server 107. In some embodiments, communication network 120 further facilitates internet communication between database 102 and server 107. For example, database 102 and server 107 may communicate through communication server 118c of communication network 120 although most often, the networking equipment through which systems external to the communication system communicate is not the same. Sometimes, even a single communication kernel of data is broken up and each divided portion is transmitted through one or more different networking devices of communication network 120. It is understood that while communication network 120 is shown to include a limited amount of networking equipment, such as servers 118 and server farm 116, communication network 120 may indeed and typically does include another amount of networking equipment. Additionally, or alternatively, communication network 120 may and often does include other types of networking equipment than those shown in the embodiment of FIG. 1 through which various illustrated systems establish communication. For example, server 107 and vehicle entertainment system 110 are shown to communicate through servers 118a and 118b in FIG. 1. In some embodiments, server 107 and vehicle entertainment system 110 may communicate through routers in addition to or in place of servers 118a and 118b. Server farm 116 may include one or more network devices for transmitting internet-generated audio content items; for example, server farm 116 may include one or more servers for transmitting a particular internet audio channel.

In some cases, while not shown in FIG. 1, communication network 120 may further facilitate internet communication between vehicle entertainment system 110 and database 102. For example, instead of or in addition to database 102 communicating with vehicle entertainment system 110 through interface 124, database 102 may communicate through communication networking equipment of communication network 120 to vehicle entertainment system 110. Similarly, server farm 116 may be made of different networking equipment or vehicle entertainment system 110 may receive internet-generated (streamed) audio content from additional or other networking equipment in communication network 120.

In some embodiments, vehicle 106 is internet-ready and configured to receive internet-streamed audio content instead of or in addition to broadcast audio content items 105. In some embodiments, speech data packets are received at an audio receiver of vehicle entertainment system 110 of vehicle 106. For example, vehicle 106 may receive packets of audio-streamed content from an internet radio station generated from server farm 116. Vehicle entertainment system 110 of vehicle 106 may play an audio content item received from a broadcast or internet-streamed. Alternatively, or additionally, another audio transmitting device in vehicle 106 may play the audio content. While the audio content is playing in vehicle 106, vehicle entertainment system 110 may transmit audio content data relating to the audio content being played to server 107 for building or editing a user-specified audio playlist based on the audio content corresponding to the transmitted audio content data. Vehicle entertainment system 110 of vehicle 106 may instead or in addition, transmit the audio content data to database 102 for storage. For example, vehicle entertainment system 110 may transmit audio content data identifying various audio content playing in vehicle 106 at various times to database 102 for storage and subsequent transmission to server 107 for building or editing a user-specified playlist. Vehicle entertainment system 110 may build or edit an in-vehicle audio playlist in addition to or in place of the audio playlist built or edited by server 107.

In some embodiments, the system listens for and receives an audio input (e.g., a user-uttered command) in-vehicle and, based on the audio input, generates or edits, or requests generating or editing, one or more audio playlists with an audio content item. The audio content item may be a currently in-vehicle playing audio content item. Playlist generation, processing, or editing may be triggered by an audio command trigger preceding an audio playlist command (e.g., the uttered command) that when detected by the system, causes the system to process the command. The audio playlist command may be related to an action the system is directed to take in connection with an audio playlist. An example of an audio input including an audio command trigger and an audio playlist command is provided in FIG. 3A.

In one embodiment, as shown in FIG. 1, the system facilitates in-vehicle generation or editing of audio playlists based on a selection of audio content items received from multiple broadcast streams from different geographical areas (e.g., New Jersey, California, Texas, etc.) or from internet-streaming sources of server farm 116. The system may solicit a third-party audio service over a network, for example server 107, for building and editing audio playlists. The system receives one or more broadcast audio content items (e.g., content provided by radio stations) from audio content sources and/or internet-generated audio content streaming from one or more internet radio stations. In some embodiments broadcast sources and internet sources are radio stations broadcasting and transmitting, respectively, audio (sometimes with related metadata) by radio waves and internet communications, respectively, that is intended to reach a wide audience. The system receives the broadcast content items from the entire country (e.g., USA) or a geographical area (e.g., North America) and internet content items from internet radio stations as selected by the user. In some embodiments, the system receives all broadcast content items from the entire country (e.g., USA) or a geographical area (e.g., North America) as selected by the user. The received broadcast and/or streamed content items can be for a time period (e.g., 30 minutes, 60 minutes or 120 minutes) or continuously recorded. For example, the system may record the broadcast and streamed content items for a specific time period from broadcast content sources and internet content sources (e.g., radio stations) for processing and use in generating the playlist. In an embodiment, after the specific time period has passed, the recorded broadcast and streamed content items are deleted. In another embodiment, the system records all broadcasts and streaming continuously and provides such recordings for processing and use in generating the playlist. The received broadcast and streamed content items are optionally stored in a database 102 for processing and used in generating the playlist. In some embodiments, the received broadcast and streamed content items are optionally stored in a storage incorporated in or coupled to vehicle entertainment system (e.g., storage 514 of FIG. 5.)

The system processes each of the broadcast audio content items and internet audio content items by performing content recognition and in some cases, geographical origin recognition, to determine metadata for each audio content item. For example, a first broadcast or streamed audio content item is processed and determined to be the song "Dream On" and/or music from a radio station in Memphis. In some embodiments, all broadcast and streamed audio content items are processed to determine at least a content type.

As previously discussed, vehicle 106 may be an autonomous vehicle, a vehicle that is capable of sensing its environment and moving safely with little or no human input. The vehicle can be an internet-connected vehicle, a vehicle that can communicate bidirectionally with other systems outside of the vehicle. The vehicle can communicate bidirectionally via antenna array 108 with array 104 and communication network 120, respectively, to facilitate generating the playlist based on the selections and the received broadcast and streamed content items.

In an example implementation, at 1) in FIG. 1, vehicle entertainment system 110 receives internet-generated audio content items 109 from server farms 116 of communication network 120 and broadcast audio content items 105 from various geographic regions in the U.S. Vehicle entertainment system 110 plays the received audio content items in vehicle 106. A particular audio content item currently playing in vehicle 106 may be indicated by a command utterance from a driver or occupant of vehicle 106, at 2) in FIG. 1. For example, the song "Dream On" may be playing in vehicle 106 and an occupant may utter "TIVO: Add this song to my Spotify playlist." In this case, the word "TIVO" is a trigger to vehicle entertainment system 110. In an embodiment, vehicle entertainment system 110 listens for a trigger that may not necessarily be "TIVO" but is rather another word or phrase known to vehicle entertainment system 110 to signify an upcoming uttered playlist-related command. With continued reference to the above example, vehicle entertainment system 110 may detect the utterance "TIVO" by implementing a speech recognition algorithm as further discussed below. Vehicle entertainment system 110 may further detect the command "Add this song to my Spotify playlist" and determine a metadata. The metadata includes identifying information (i.e., audio content identifier) regarding the currently playing audio content such as, without limitation, the title, artist, and genre of the song. Vehicle entertainment system 110 may further detect the third-party service, Spotify, in the audio playlist command of the audio input. In the above example, Spotify is identified as the third-party service and server 107 may be a Spotify server. In some embodiments, at 3), vehicle entertainment system 110 may transmit the audio content identifying part of the metadata—the audio content identifier—of the currently playing song to database 102 for storage, processing, and use in building or editing a playlist of a particular category, for example.

In some embodiments, vehicle entertainment system 110 may translate the audio content identifier of the metadata detected in the currently playing audio content to an identifier recognizable to the third-party service, in the above example, Spotify. The third-party service may or may not employ a unique identifier and may recognize the audio content identifier of the metadata in the currently playing audio content in which case, no translation is necessary and vehicle entertainment system 110 transmits the audio content identifier to server 107 through interface 112, at step 4) in FIG. 1. In some embodiments, vehicle entertainment system 110 transmits the audio content identifier to server 107 in a proxy file, as shown in FIG. 1. In embodiments where vehicle entertainment system 110 translates the audio content identifier to a third party audio content identifier, vehicle entertainment system 110 may transmit the third party audio content identifier instead of the audio content identifier of the metadata to server 107. To determine whether or not the audio content identifier requires translation, vehicle entertainment system 110 may maintain and search a table of correspondences between third-party services and third-party audio content identifiers, and if vehicle entertainment system 110 fails to find such a correspondence in the table, vehicle entertainment system 110 may determine no translation is necessary and vehicle entertainment system 110 may determine to transmit the audio content identifier from the metadata of the currently playing audio content with the proxy file at step 4) to server 107. Whereas, if vehicle entertainment system 110 finds an associated third-party audio content identifier in the table, vehicle entertainment system 110 may determine to transmit the associated third-party audio content identifier with the proxy file at step 4) to server 107. For example, in the case where vehicle entertainment system 110 finds a unique audio content identifier (third-party audio content identifier) for "Spotify" in a maintained table, vehicle entertainment system 110 may transmit the unique identifier to server 107 for recognition of the song "Dream On" by Spotify. The third-party audio content identifier may be compliant with a protocol unique to the third-party service. For example, a certain sequence of numbers or letters in the beginning of the identifier may have a certain significance in identifying the third-party service. In some embodiments, vehicle entertainment system 110 does not transmit the audio content (e.g., the song "Dream On") with the proxy file at 4) because the audio content may be a large file and unnecessary for the recognition of the song given the metadata audio content identifier. In some embodiments, vehicle entertainment system 110 may transmit the audio content with the proxy file for possible faster audio content identification by server 107.

Next, at 5) in FIG. 1, vehicle entertainment system 110 receives a playlist of one or more audio content identifiers of the audio content in the playlist built by server 107. The playlist includes the audio content identifier of the audio content that was playing in vehicle 106 when the vehicle occupant asked to add the content to a Spotify playlist. Accordingly, system 100 builds a user- or occupant-commanded playlist without the need or assistance of an externally located device to vehicle entertainment system 110, such as a smartphone. Unlike conventional techniques, system 100 does not require an application-to-application communication to consummate playlist processing based on a currently playing audio content item.

In some embodiments, vehicle entertainment system 110 is self-contained and includes a vehicle content interface application that when executed by one or more processors of vehicle entertainment system 110 may cause the above-identified steps and steps as discussed and shown relative to the embodiment of FIG. 1 to be performed by vehicle entertainment system 110.

In an embodiment, vehicle 106 of system 100 may recognize content in an audio input received from a user or occupant of vehicle 106, for example a driver utterance, by implementing a natural language detection process. In some embodiments, system 100 may detect an utterance, for example an audio input (e.g., "TIVO: Add this song to my Spotify playlist"), by implementing natural language processes. Vehicle entertainment system 110 may implement or solicit a speech detection algorithm to determine the start and end of a phrase based on a sequence validating technique. For example, vehicle entertainment system 110 may implement a segmental conditional random field (CRF) algorithm or use a hidden Markov model (HMM) or a long short-term memory (LSTM) model to predict the end of the audio signal corresponding to a phrase or sentence. In implementations using model-based prediction, such as with the use of HMM or LSTM models, the model may be trained to predict whether the uttered word is a start of the sentence, an intermediate word or the last word of the sentence. A model may be trained in a variety of ways to predict features such as, without limitation, question tags, WH ("what") words, articles, part-of-speech tags, intonations, syllables, or any other suitable language attributes. The term "tag," as used herein, refers to a label that is attached to, stored with, or otherwise associated with a word or a phrase. For instance, "verb" is an example of a part-of-speech tag that may be associated with the word "running." Part of speech is one example of a feature or a type of tag value. An influential word is another example of a feature or a type of tag value. During the training of the model, a collection of word-to-tag mappings is fed to the model along with an input sentence. As used herein, the term "label" refers to a value or outcome that corresponds to a sample input (e.g., a query, features, or the like) and that may be employed during training of the model. In some examples, the model is trained by way of supervised learning based on labeled data, such as sample inputs and corresponding labels. In some examples, features may be referred to as dependent variables, and labels may be referred to as independent variables.

A sequence validation technique may be executed on a sentence or phrase in a forward and a backward direction for improved prediction reliability but at the expense of requiring a separate model and model training for each direction, a rather costly approach. A sequence structure validation may be employed using conditional probability at its base, for example, the Bayes theorem, to store states at different points in time of a sentence. In some embodiments, an extension to the basic sequence structure validation algorithm may be implemented with Markov chains. Markov chains introduce hidden states at every state transition, for example, between the words of a phrase or sentence, or between syllables of words of a phrase or sentence. The labels used for each such training example are the points in time at which the phrase (spoken utterance) may start and end.

In some embodiments, the start of a phrase is typically driven by decisions taken during the handling of the last packet of a phrase, and a list of contextual information is passed to the next audio chunk (or packet). In some cases, a silent duration of a predefined duration may be detected in real time to help shift to a new context. In some embodiments, silent duration detection may be implemented based on heuristics.

Figure 2:
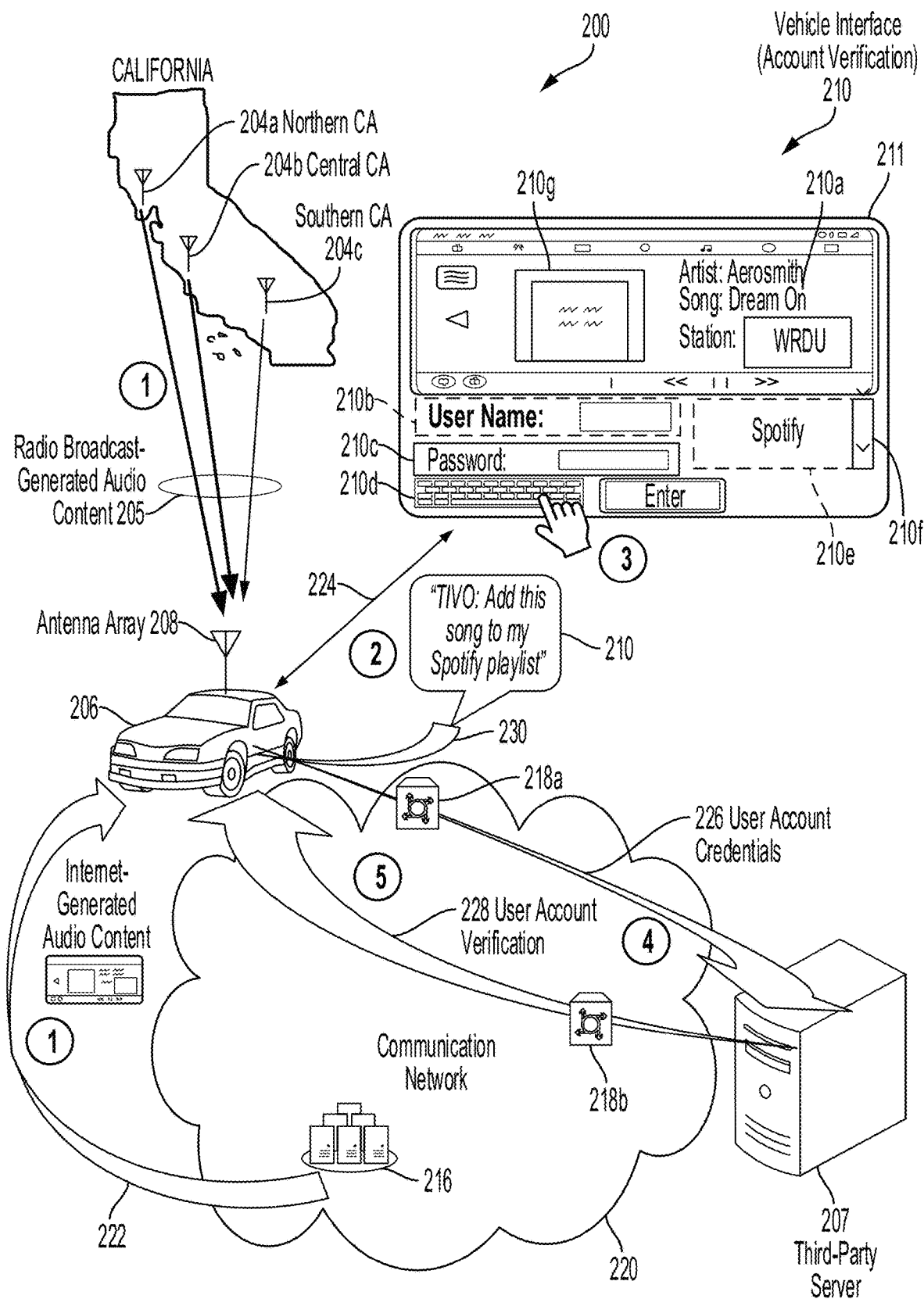

FIG. 2 shows an illustrative diagram of an exemplary audio playlist generation system 200, in accordance with some embodiments of the disclosure. In some embodiments, system 200 is configured as system 100 of FIG. 1 and similarly performs on-demand vehicle-commanded audio playlist generation, processing, management, and maintenance based on audio content items played in the vehicle and sourced from one or more audio content types. For example, as shown in FIG. 2, system 200 includes an array 204 of antennas (204a, 204b, 204c, 204d . . . 204n, "n" being an integer value), analogous to array 104 of FIG. 1; a vehicle 206 with antenna array 208 having a vehicle entertainment system 210, and third-party server 207, analogous to vehicle 106 with antenna array 108 having a vehicle entertainment system 110, and third-party server 107, respectively, of FIG. 1, and a communication network 220 analogous to communication network 120 of FIG. 1. Similarly, vehicle 206 of FIG. 2 includes a vehicle entertainment system 210, analogous to vehicle entertainment system 120 of vehicle 106 of FIG. 1. Vehicle entertainment system 210, server 207, and communication network 220 of FIG. 2 may be coupled as discussed and shown relative to vehicle entertainment system 110, server 107, and communication network 120 of FIG. 1, respectively. It is understood that while a database, such as database 102, is not shown in the embodiment of FIG. 2, in some embodiments, such a database may be communicatively coupled to vehicle 206, server 207, and communication network 220, as shown and described relative to vehicle 106, server 107, and communication network 120, of FIG. 1, respectively.

With reference to FIG. 2, vehicle entertainment system 210 of vehicle 206 is further shown to include a user interface 211. User interface 211 may display information in connection with a currently playing audio content item (e.g., the song "Dream On") and one or more third-party services. In an example embodiment, user interface 211 displays currently playing audio content item 210g, metadata item 210a associated with the currently playing audio content item (e.g., artist name, genre . . . ), third-party service identification item 210e, username item 210b, password item 210c, and touchscreen keyboard item 210d, which may include an "Enter" option for completing a user selection when activated. It is understood that user interface 211 is merely an example display and that other types of audio content information or more or less audio content information may be displayed with user interface 211. In some embodiments, the displayed items are user-selectable, for example, by an occupant or driver of vehicle 206. Username and password items 210b and 210c are collectively user service account information with a third-party service. For example, they may be the username and password of an occupant or driver of vehicle 206 with a Spotify account. In some embodiments, vehicle entertainment system 210 may store an occupant's third-party service account information for convenience and may determine the user account credentials based on a stored correspondence in a table of correspondences of user identification and associated third-party user account information. In some embodiments, the account credentials may be user-entered as shown in FIG. 2.

In one example, a vehicle content interface application executing on a processor vehicle entertainment system 210 may display the user interface 211 with options for selection. For example, the user interface 211 may provide a selection for third-party service identification 210f (Spotify, Pandora, iHeartRadio, etc.)

The system generates an audio playlist based on vehicle 206 user or occupant selections and the received broadcast and internet audio content items. In some embodiments, the received broadcast and internet audio content items are stored in a database, such as database 102 of FIG. 1, not shown in FIG. 2. For example, based on an audio input, the system determines a metadata of a currently playing broadcast or internet-generated audio content, an audio content identifier and optional other audio content information extracted from the metadata may be transmitted to server 207 for building a playlist. The playlist may include the currently playing audio content item received from server 207. In some embodiments, the playlist may be buffered for presentation in vehicle 206.

In an example implementation, the vehicle content interface application executing in vehicle entertainment system 210 may cause a certain sequence of steps to be performed based on the received internet and/or broadcast audio content items, as shown at step 1) (encircled) in FIG. 2. At step 2) in FIG. 2, while an audio content item, broadcast or internet-generated, is playing on vehicle entertainment system 210, vehicle entertainment system 210 receives an audio input including an audio command trigger (e.g., "TIVO") and an audio playlist command (e.g., "Add this song to my Spotify playlist"). At step 3), the items shown and discussed above relative to user interface 211 may be displayed on a display of vehicle entertainment system 210 or a display coupled to vehicle entertainment system 210. In the former case, the items may be displayed on a console of vehicle 206, which may be a part of vehicle entertainment system 210 or externally located to the vehicle entertainment system 210, in vehicle 206. Part of the displayed items of user interface 211 may be displayed prior to step 3). For example, metadata item 210a and audio content identification item 210g may be displayed before step 3), at a time when the currently displayed item is playing. User interface 211 may display metadata item 210a and audio content identification item 210g, or other information regarding a currently playing audio content item, at the beginning of the time the currently playing audio content item starts to play. It is understood that other audio content-related information may be displayed before step 3) in FIG. 2.

At step 4) of FIG. 2, vehicle entertainment system 210 may verify the user credentials (account information) with a corresponding third-party-affiliated server based on the user or occupant selection or input of user account credentials at user interface 211. For example, vehicle entertainment system 210 may verify username item 210b and password item 210c, as entered in user interface 211, with server 207 through interface 226 and communication network 220 before a user-specified audio playlist may be generated. Upon receiving confirmation of the user account credentials from server 207 through interface 228 and communication network 220, vehicle entertainment system 210 may request to build or edit a playlist that includes the user-specified audio content item request at step 2) in accordance with the steps shown and discussed relative to the embodiment of FIG. 1.

Figure 3A:
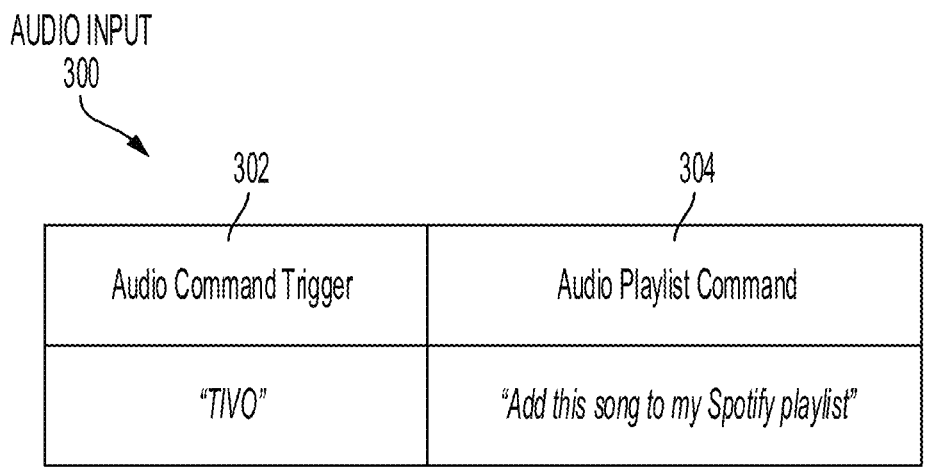
FIG. 3A shows an illustrative diagram of an example of an audio input received by an audio playlist generation system, in accordance with some embodiments of the disclosure.

FIG. 3A shows an illustrative example of an audio input employed in an audio playlist generation system, in accordance with some embodiments of the disclosure. In FIG. 3A, an example audio input 300 is shown for implementation in an audio playlist generation system, in accordance with some embodiments of the disclosure. Audio input 300 may be uttered by a user or occupant of a vehicle such as, without limitation, a user or occupant of vehicles 106 and 206 of FIGS. 1, 2, respectively, to cause a respective vehicle entertainment system, such as, without limitation, systems 110 and 210 of FIGS. 1, 2, to perform certain playlist processing actions. As shown in FIG. 3A, audio input 300 includes two distinct audio input portions. A first portion is an audio command trigger 302 for prompting the vehicle entertainment system to expect to receive a following playlist command. The second portion of audio input 300 is an audio playlist command 304 for performing a specific action on a playlist. In the example of FIG. 3A, audio command trigger 302 is the utterance "TIVO," an advance notice of a command to follow. In some embodiments, every time the vehicle entertainment system detects trigger 302, the vehicle entertainment system prepares for the immediately following utterance to be a vehicle entertainment-related comment. For example, the following utterance may be a playlist-related command. The following utterance need not be a command or playlist-related and may be any comment recognizable to the vehicle entertainment system for performing or processing an action related to the corresponding vehicle. For example, the utterance following trigger 302 may be to gauge the inside temperature of the vehicle (e.g., "TIVO: Check car temperature") or to ensure the windows of the vehicle are rolled up (e.g., "TIVO: Car windows status check"). It is understood that trigger 302 need not be "TIVO.". In the former case, the vehicle entertainment system may include or have access to a temperature sensor device for measuring the inside temperature of the corresponding vehicle.

In some embodiments, trigger 302 may be another word a phrase, or a sentence programmed into the vehicle entertainment system to invoke a subprogram, a subroutine, or a part of a main program for processing the command, audio playlist command 304, to be performed by the vehicle entertainment system. In some embodiments, hardware or a combination of hardware and software in the vehicle entertainment system may be designed to detect trigger 302 and to process the action to follow. Audio playlist command 304 may be a word, a phrase, or a sentence that when detected signifies a playlist-related action to be performed. For example, in FIG. 3A, audio playlist command 304 is the following part of the above example: "Add this song to my Spotify playlist." Upon detecting this phrase, a vehicle entertainment system knows to look for a third-party service identification, such as "Spotify," and to perform a playlist-related action with a third-party service, such as to "add" the currently playing song to a "playlist."

In some embodiments, the vehicle entertainment system maintains a list of known third-party service providers, such as, without limitation, Spotify, Pandora, iHeartRadio, etc. The system may compare a detected name in command 304 with the list and, in response to a match, direct a server or other network equipment of a corresponding service to build the playlist with the currently playing song. In some embodiments, in accordance with command 304, the vehicle entertainment system may request an action on a playlist based on an audio content item not currently playing. For example, command 304 may include the utterance "Add the last song to my Spotify playlist," in which case the song immediately preceding the currently playing song may be added to the user Spotify playlist. In embodiments with systems having the capability to maintain a recording of past content, for example, the last 30 minutes of content, as previously discussed herein, the vehicle entertainment system may identify, for example, the song that immediately preceded the currently playing song from the recording and add or requests, adding the recorded song to the playlist accordingly. In some embodiments, command 304 may be in reference to a playlist category or playlist type. For example, command 304 may be the utterance "Generate a playlist of the same genre on Spotify." In this case, the vehicle entertainment system creates a new playlist of music of a genre common to the genre of a currently playing music. For example, assuming "Dream On" is currently playing, the vehicle entertainment system may make a request to a Spotify server, such as servers 107 and 207 of FIGS. 1, 2, respectively, to start a soft rock genre playlist. The vehicle entertainment system may detect an audio content genre type based on a maintained database of audio content items by category and finds a match between the particular genre of the currently playing audio content, based on the currently playing audio content metadata and the stored list of audio contents by genre. For example, assuming the currently played audio content item is the song "Dream On" and the metadata of "Dream On" indicates the genre, the vehicle entertainment system searches the audio content items by genre in the database (e.g., database 102 of FIG. 1), and if the vehicle entertainment system detects a match, the vehicle entertainment system determines that the detected genre is the same genre as the song "Dream On." A playlist may be generated or processed based on categories other than genre, for example, a playlist may be generated based on artist or producer. In some embodiments, a database communicatively coupled to a vehicle entertainment system may maintain playlist categories. For example, in the embodiment of FIG. 1, database 102 may maintain audio content items by playlist categories. In some embodiments, the database stores the playlist categories in accordance with audio content identifiers instead of the audio content. In some embodiments, the database may further or alternatively maintain the audio content identifiers by service providers, such as Spotify or Pandora, or by other audio content-related categories. In some embodiments, the information stated above to be stored in a database may be stored in a storage incorporated in or coupled or accessible to the vehicle entertainment system (e.g., 514 of FIG. 5.)

Command 304 may not necessarily identify Spotify or any other playlist service, in which case, the vehicle entertainment system may take various actions. The vehicle entertainment system may ignore and not process the command. Alternatively, the vehicle entertainment system may perform the command without assistance from a service provider. For example, the vehicle entertainment system may add the currently playing audio content item to a playlist maintained by the vehicle entertainment system or a storage device coupled or accessible to the vehicle entertainment system. In some embodiments, the option of generating or processing an in-vehicle playlist or a third-party service playlist is a user selection made by a driver or occupant of the vehicle, for example, from a selection presented on a user interface of vehicle 106 or vehicle 206 of FIGS. 1, 2, respectively. An example of third-party and in-vehicle playlist selections available to a user is shown and described relative to FIG. 9.

Figure 3B:
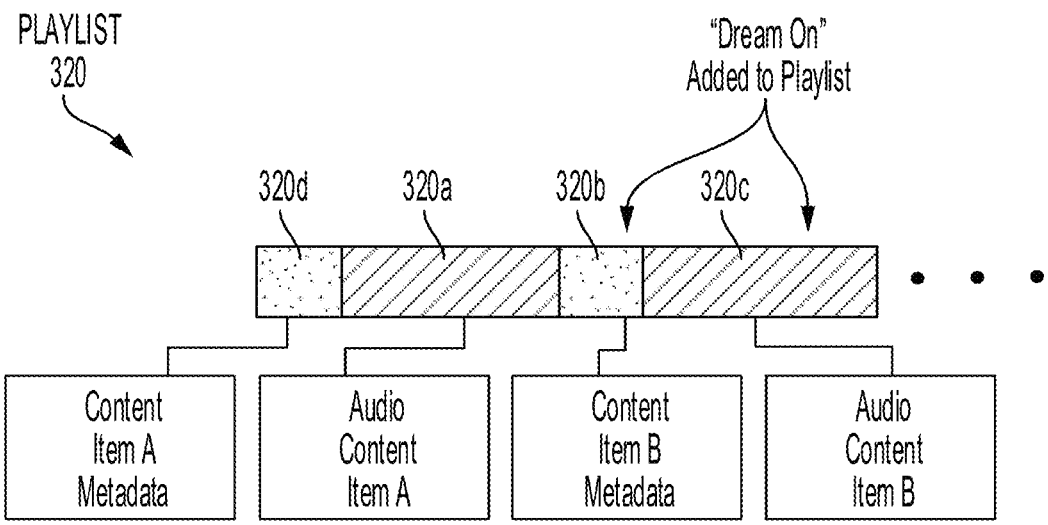
FIG. 3B shows an illustrative diagram of an example of a playlist generated by an audio playlist generation system, in accordance with some embodiments of the disclosure.

FIG. 3B shows an illustrative example of an audio playlist generated by an audio playlist generation system, in accordance with some embodiments of the disclosure. In FIG. 3B, an example audio playlist 320 is shown for implementation in an audio playlist generation system, in accordance with some embodiments of the disclosure. In nonlimiting examples, playlist 320 may be built, processed, and maintained by systems 100 and 200 of respective FIGS. 1, 2. In an example application, vehicle entertainment systems 110 and 210 of systems 100 and 200, respectively, may receive playlist 320 from respective servers 107, 207, in response to a request from a corresponding vehicle entertainment system to add an audio content item to an existing playlist or to build a new playlist based on the audio content item. In some embodiments, playlist 320 is built or edited by vehicle entertainment systems 110 or 210.

With reference to FIG. 3B, playlist 320 is shown to include a series of audio content items separated by corresponding content metadata. More specifically, playlist 320 is shown to include two audio contents items, audio content item A 320a and audio content item B 320c, separated by content item B metadata 320b. Content item A metadata 320d corresponds to audio content item A 320a, and content item B metadata 320b corresponds to audio content item B 320c. Each of the content item metadata includes information or data relating to a corresponding audio content item. For example, metadata 320d and metadata 320b may each include all or part of the following information regarding corresponding audio content item A 320a and audio content item B 320c:

Title
Artist
Album
Song title
Genre
Album artwork
Song number

Each metadata may have audio content-related information other than the information listed above. Each of the above or other metadata type of information may be an audio content identifier identifying a corresponding audio content item (e.g., Title) or information relating to the audio content (e.g., Artist, Album, etc.) to a vehicle entertainment system. For example, an audio content identifier in the metadata may identify a corresponding audio content item by title. Each of the above or other metadata type of information may be a third-party audio content identifier identifying a corresponding audio content to a third-party service. For example, the Title may be identified to a third-party service, such as servers 107 and 207 of FIGS. 1, 2, respectively, after translation to a third-party audio content identifier. In some embodiments, one or more of the audio content identifiers listed above may be stored in a memory or storage location or instead, a reference to the location of the identifiers in a memory or storage location may be stored.

In some embodiments, a playlist may include-a higher or lowernumber of audio content items than the number of audio content items shown in FIG. 3B. The metadata of each audio content item is shown located immediately prior to the corresponding audio content item, in FIG. 3B. For example, content item B metadata 320b is located immediately prior to audio content item B 320c. In some embodiments, the metadata may be located in a different position relative to a corresponding audio content item, for example and without limitation, at the end of and immediately following the audio content item or in the middle or embedded elsewhere in the audio content item. In some embodiments, the metadata may be split in parts, for example, references to the metadata and the metadata parts may be dispersed in multiple distinct locations of a corresponding audio content item. For example, a first part of the metadata may be located in front of the corresponding audio content (in the metadata location shown in FIG. 3B), another part of the metadata may be located in the middle of the corresponding audio content item and a last part of the metadata may be located immediately following the corresponding audio content item.

In some embodiments, the playlist may be a list of audio content items, where the audio content of the audio content items is separately stored in a content database. With continued reference to FIG. 3B and with additional reference to FIG. 1, for example, the audio content of audio content item A 320a, audio content item B 320c, and the audio content of the remaining audio content items of playlist 320 may be stored in database 102 (FIG. 1). In some embodiments, the metadata or audio content identifiers of audio content items may be separately stored in the content database. For example, metadata 320d, 320b, and the remaining metadata or audio content identifiers of corresponding metadata may be stored in database 102. In both of these cases, vehicle entertainment system 110 of vehicle 106 may directly or indirectly store the audio content, metadata, or audio content identifier in database 102.

Figure 3C:
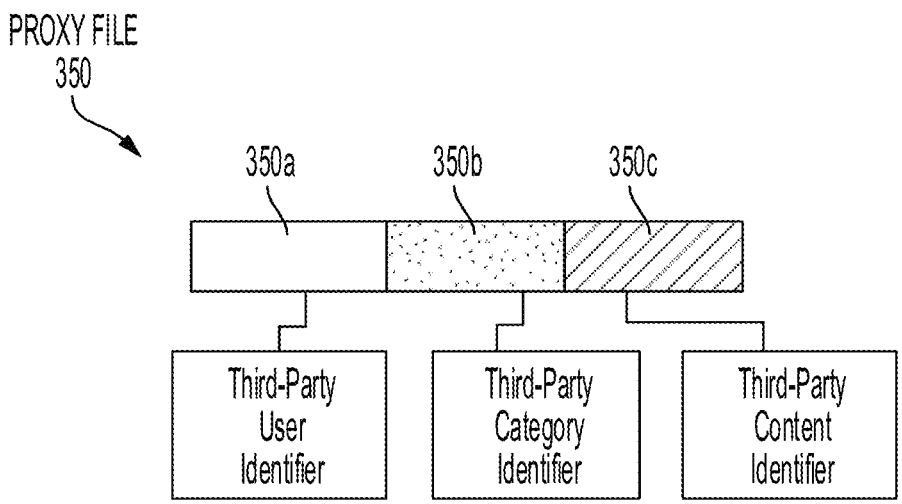
FIG. 3C shows an illustrative diagram of an example of a proxy file implemented by an audio playlist generation system, in accordance with some embodiments of the disclosure.

FIG. 3C shows an illustrative example of a proxy file generated by an audio playlist generation system, in accordance with some embodiments of the disclosure. In FIG. 3C, an example proxy file 350 is shown generated by an audio playlist generation system, in accordance with some embodiments of the disclosure. In nonlimiting examples, playlist 350 may be generated and transmitted to a corresponding third-party server by vehicle entertainment systems 106, 206 of respective systems 100, 200 of FIGS. 1, 2. Proxy file 350 generally includes information recognizable to a targeted service and relating to a playlist to be built or updated. In some embodiments, proxy file 350 includes information recognizable to a targeted third-party service relating to a playlist to be constructed that includes a currently playing audio content item by a vehicle entertainment system, such as systems 110, 210 of FIGS. 1, 2, respectively.

A proxy file may carry various audio content-related information. In the example of FIG. 3C, proxy file 350 is shown to include third-party user identifier 350a, third-party category identifier 350b, and third-party (audio) content identifier 350c. Each, all, or a combination of the three may have a format pursuant to a particular service-specified protocol. In some embodiments, third-party user identifier 350a is a string uniquely identifying a provider account holder (or user) to a corresponding third-party service. For example, identifier 350a may identify a user or occupant of vehicles 106, 206 to servers 107, 207 of respective FIGS. 1, 2. Third-party category identifier 350b may be a string uniquely identifying a particular third-party audio category, for example, genre, album, artist, etc., such as described above relative to FIG. 3B. It is understood that proxy file 350 may include additional or fewer third-party information items than the three that are shown in FIG. 3C. Additionally, or alternatively, proxy file 350 may include different or additional audio content information types useful for identifying certain audio content information to a third party. For example, while not shown in FIG. 3C, proxy file 350 may include additional fields, such as a third-party uniform resource identifier (URI) field and/or a third-party uniform resource locator (URL) field. With continued reference to the Spotify example above, proxy file 350 may include a Spotify URL for user access to the audio content items of a playlist under construction at a vehicle entertainment system of various embodiments of the disclosure, or at an externally located computer. Proxy file 350 is not limited to the foregoing fields and may include additional, fewer, and different kinds of fields related to a third-party playlist service provider, audio content items, and the playlist under construction.

Figure 4:
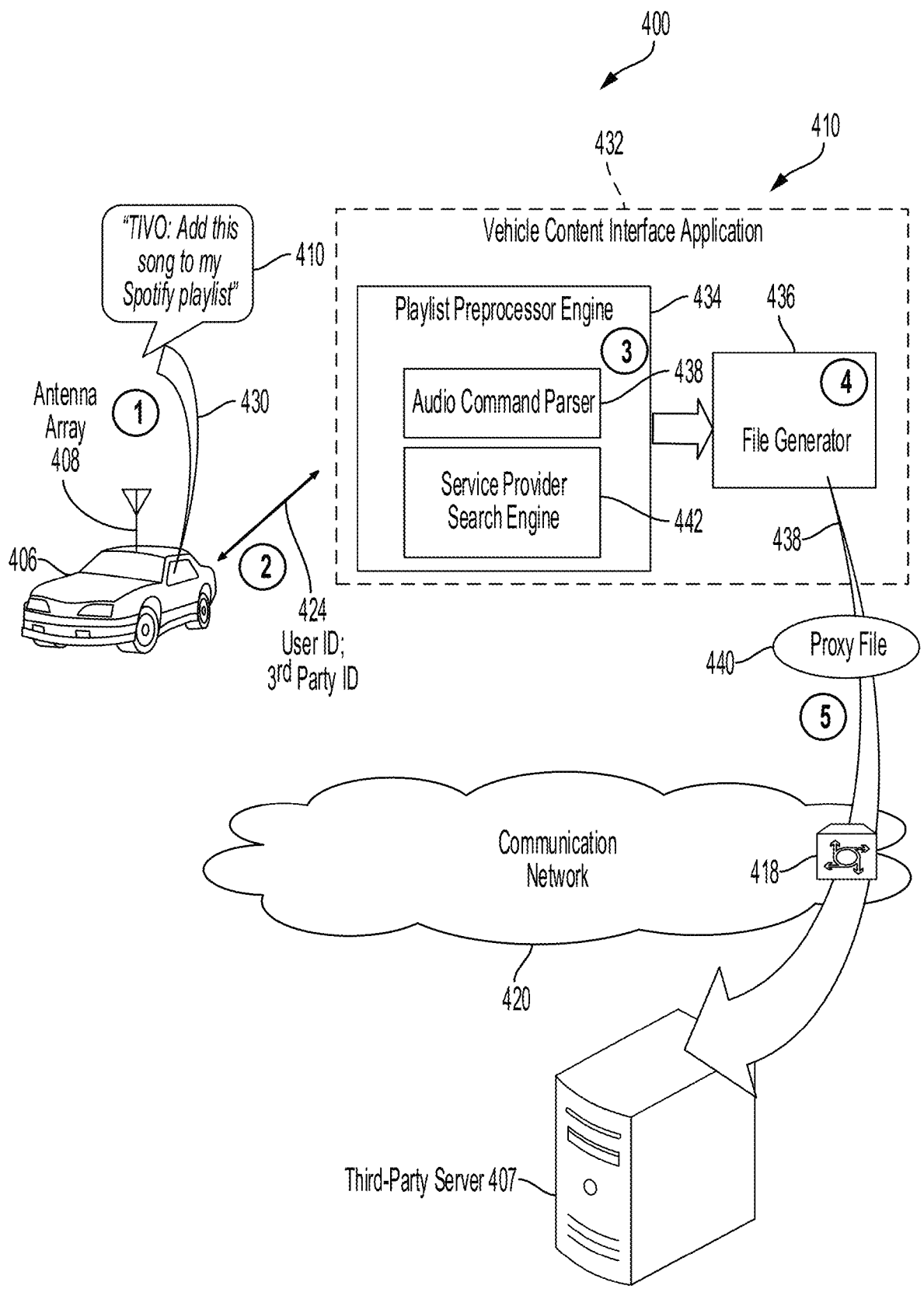
FIG. 4 shows an illustrative diagram of an audio playlist generation system, in accordance with some embodiments of the disclosure.

FIG. 4 shows an illustrative diagram of an exemplary audio playlist generation system 400, in accordance with some embodiments of the disclosure. In some embodiments, system 400 is configured as system 100 or system 200 of FIGS. 1, 2, respectively, and similarly performs on-demand vehicle-commanded audio playlist generation, processing, management, and maintenance based on audio content items played in the vehicle and sourced from one or more audio content types. For example, as shown in FIG. 4, system 400 includes a vehicle 406 with antenna array 408 having a vehicle entertainment system 410, and third-party server 407, analogous to vehicle 106 with antenna array 108 having vehicle entertainment system 106, and third-party server 107, respectively, of FIG. 1, and a communication network 420 analogous to communication network 120 of FIG. 1. Vehicle entertainment system 410, server 407, and communication network 420 of FIG. 4 may be coupled as discussed and shown relative to vehicle entertainment system 110, server 107, and communication network 120 of FIG. 1, respectively. It is understood that while a database, such as database 102, is not shown in the embodiment of FIG. 4, such a database may be communicatively coupled to vehicle 406, server 407, and communication network 420, as shown and described relative to vehicle 106, server 107, and communication network 120, of FIG. 1, respectively.

In some embodiments, each of vehicles 106, 206, and 406 of respective FIGS. 1, 2, and 4 is an internet-connected car, and the vehicle entertainment system thereof, for example, vehicle entertainment systems 110, 210, and 410 of vehicles 106, 206, and 406, respectively, is a TIVO entertainment system in an internet-connected car.

With continued reference to FIG. 4, vehicle entertainment system 410 of vehicle 406 is shown to further include vehicle control interface application 432 which may be program code, stored in memory or storage, that when executed by one or more processors is caused to perform the functions and processes discussed below and those discussed earlier relative to the vehicle entertainment system of previous embodiments. In some embodiments, vehicle control interface application 432 may be implemented in hardware and in some embodiments, vehicle control interface application 432 may be implemented in a combination of hardware and software (such as by execution of program code). Vehicle control interface application 432 is shown to include a playlist preprocessor engine 434 and a file generator 436 for building a proxy file 440 and transmitting the proxy file 440 through interface 438 to communication network 420 and ultimately third-party server 407, analogous to the illustration and related discussion of the proxy file of FIG. 1. In an example embodiment, proxy file 440 is analogous to proxy file 350 of FIG. 3C. In some embodiments, proxy file 440 need not be analogous to proxy file 350 or the proxy file of FIG. 1 and may instead include different file content than proxy file 350 and the proxy file of FIG. 1. Proxy file 440 generally includes information useful to a third-party server, such as server 407, for recognizing audio content items and related information that is being added to or removed from a playlist. In an example application, proxy file 440 includes a third-party audio content identifier identifying an audio content item playing in vehicle 406 that is interesting to a user or occupant of vehicle 406 (at 1) in FIG. 4), as identified by a user audio input. The audio content is to be added to a playlist of a third-party service affiliated with server 407, such as Spotify.

In response to a user command in the corresponding audio input to add the currently playing audio content to a Spotify playlist, at 2), in FIG. 4, an audio command parser 438 of playlist preprocessor engine 434 parses the audio input into an audio command trigger and an audio playlist command, analogous to trigger 302 and command 304 of FIG. 3A, respectively. Playlist preprocess engine 434 determines from the parsed audio input that the audio content is to be added to a playlist of a third-party service with the user account. Accordingly, engine 434 may verify the user account credentials with the third party, Spotify, in FIG. 4, as discussed above relative to FIG. 2 and as discussed below relative to FIG. 9.

Upon successful verification of the user account, service provider search engine 442 of playlist preprocessor engine 434 may search for Spotify in association with the user account in a table of associations between verified users and corresponding third-party services at which the users are verified. In response to successful verification of the user account, i.e., finding a match between the user and Spotify, file generator 436 builds and transmits proxy file 440 as discussed above. In some embodiments, application 432 may receive the built playlist including the audio content or audio content identifier requested to be added to the playlist by the user or occupant of vehicle 406 from server 407. In some embodiments, application 432 may present the audio content items of the playlist from server 407 on a display of a user interface of vehicle entertainment system 410, such as user interface 211 of FIG. 2 or user interface 911 of FIG. 9. In some embodiments, application 432 may further play one or more of the audio content items of the playlist from server 407 on vehicle entertainment system 410.

Figure 5:
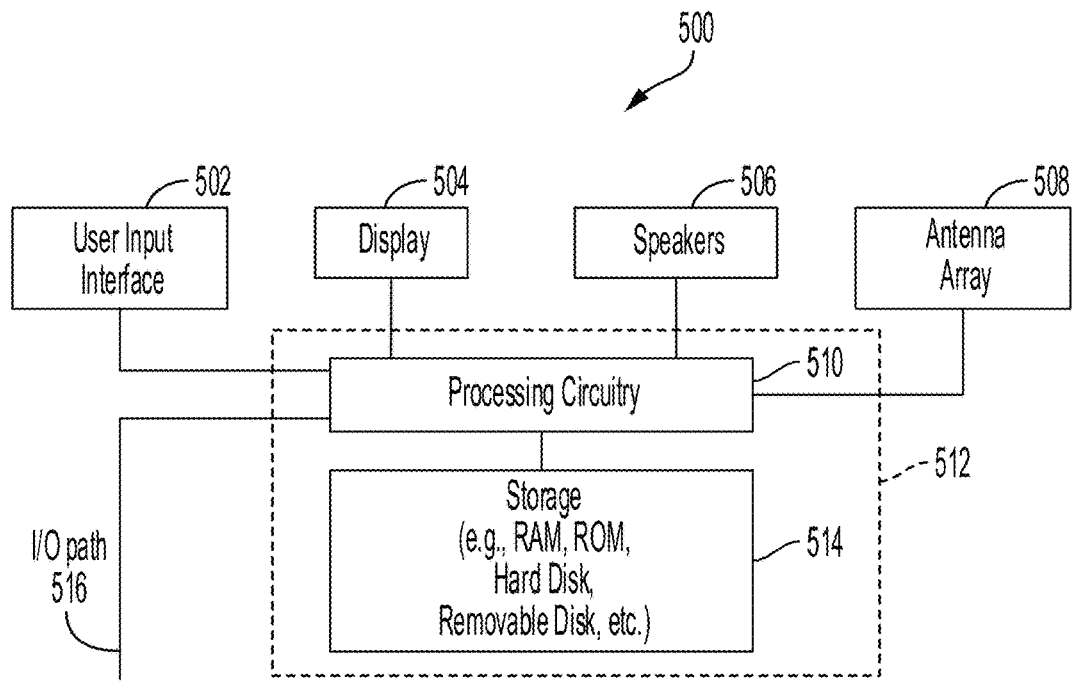
FIG. 5 depicts a block diagram of an illustrative example of a user equipment device, in accordance with one embodiment.

The user or occupant of a vehicle may access audio content items and the vehicle content interface application (and its display screens described above and below) from one or more of corresponding user equipment devices. FIG. 5 shows a generalized embodiment of illustrative user equipment device 500. More specific implementations of user equipment devices are discussed above in connection with FIG. 5. User equipment device 500 may receive content and data via input/output (hereinafter "I/O") path 516. I/O path 516 may provide content (e.g., broadcast programming, on-demand programming, internet content, content available over a local area network (LAN) or wide area network (WAN), and/or other content) and data to control circuitry 512, which includes processing circuitry 510 and storage 514. Control circuitry 512 may be used to send and receive commands, requests, and other suitable data using I/O path 516.

In some embodiments, I/O path 516 is configured as interface 130 of FIG. 1.

Control circuitry 512 may be based on any suitable processing circuitry such as processing circuitry 510. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units. In some embodiments, control circuitry 512 executes instructions for a vehicle content interface application stored in memory (i.e., storage 514). Specifically, control circuitry 512 may be instructed by the vehicle content interface application to perform the functions discussed above and below. For example, the vehicle content interface application may provide instructions to control circuitry 512 to generate the audio content display. In some implementations, any action performed by control circuitry 512 may be based on instructions received from the vehicle content interface application.

Figure 9:
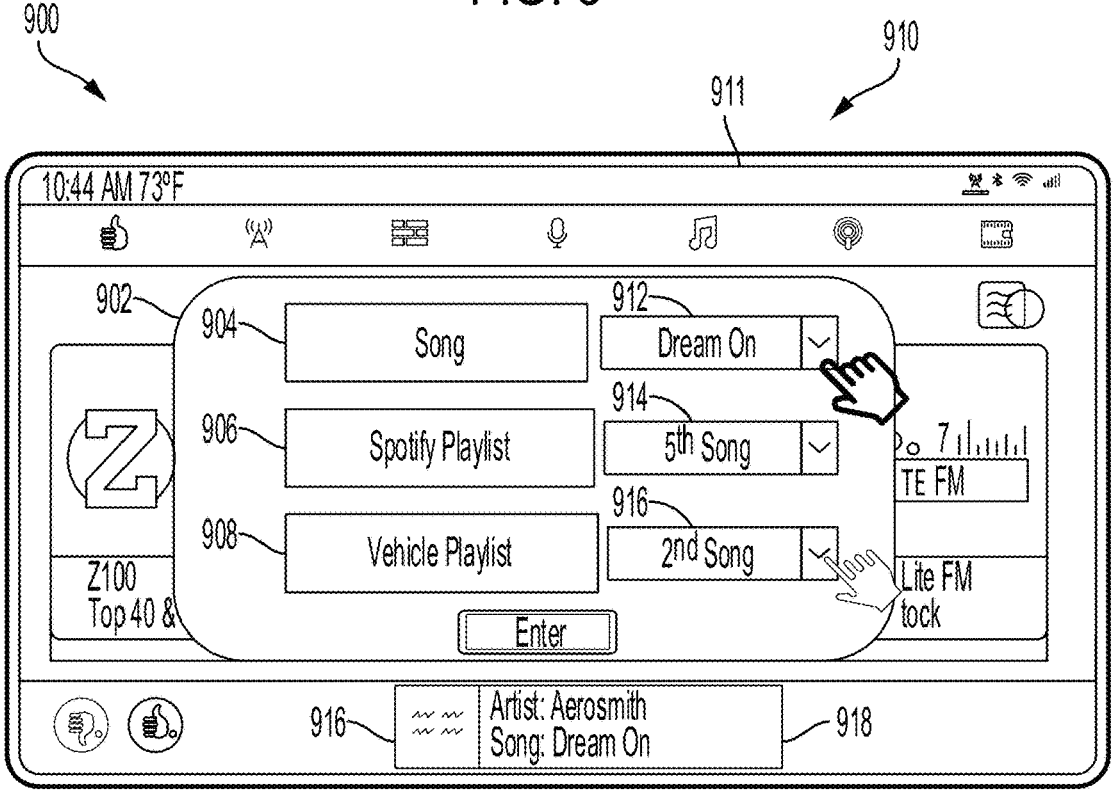
FIG. 9 shows an illustrative diagram of an example user interface employed in an audio playlist generation system, in accordance with some embodiments of the disclosure.

In some embodiments, control circuitry 512 is configured, in part or in whole, as vehicle entertainment system 110, 210, and 410 of FIGS. 1, 2, and 4, respectively; antenna array 508 is configured as antenna array 108, 208, and 408 of FIGS. 1, 2, and 4, respectively; user input interface 502 may be configured as user interface 211 and interface 911 of FIGS. 2 and 9, respectively. In some embodiments, display 504 is a display of user interface 211 and user interface 911 of FIGS. 2 and 9, respectively. In some embodiments, speakers 506 are configured as speakers of vehicle entertainment system 110, 210, and 410 of FIGS. 1, 2, and 4, respectively, for playing an audio content item in vehicle 106, 206, and 406 of FIGS. 1, 2, and 4, respectively.

In client-server-based embodiments, control circuitry 512 may include communications circuitry suitable for communicating with a content application server or other networks or servers. The instructions for carrying out the above-mentioned functionality may be stored on the content application server. Communications circuitry may include a cable modem, an integrated-services digital network (ISDN) modem, a digital subscriber line (DSL) modem, a telephone modem, Ethernet card, or a wireless modem for communications with other equipment, or any other suitable communications circuitry. Such communications may involve the internet or any other suitable communications network or paths (which are described in more detail in connection with FIG. 6). In some embodiments, an antenna 508 is provided in the user equipment device 400. The antenna 508 may be used for communication with the network of antennas. In addition, communications circuitry may include circuitry that enables peer-to-peer communication of user equipment devices, or communication of user equipment devices in locations remote from each other (described in more detail below).

Memory may be an electronic storage device provided as storage 514 that is part of control circuitry 512. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 514 may be used to store various types of content described herein as well as content data and content application data that are described above. Nonvolatile memory may also be used (e.g., to launch a boot-up routine and other instructions). Cloud-based storage may be used to supplement storage 514 or instead of storage 514.

Control circuitry 512 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 512 may also include scaler circuitry for upconverting and down-converting content into the preferred output format of the user equipment device 500. Control Circuitry 512 may also include digital-to-analog converter circuitry and analog-to-digital converter circuitry for converting between digital and analog signals. The tuning and encoding circuitry may be used by the user equipment device to receive and to display, play, or record content. In some embodiments, the control circuitry may include an HD antenna.

In one embodiment, speakers 506 may be provided as integrated with other elements of user equipment device 500 or may be stand-alone units. The audio and other content displayed on display 504 may be played through speakers 506. In some embodiments, the audio may be distributed to a receiver (not shown), which processes and outputs the audio via speakers 506. For example, vehicle entertainment system 110 of system 100 may play an audio content item via speakers 506 in vehicle 106 (FIG. 1.)

In some embodiments, a sensor (not shown) is provided in the user equipment device 500. The sensor may be used to monitor, identify, and determine vehicular data. For example, the vehicle content interface application may receive vehicular speed data from the sensor or any other vehicular status data (e.g., global positioning data of the vehicle, driving condition of the vehicle, etc.) received from any other vehicular circuitry and/or component that describes the vehicular status of the vehicle.

The vehicle content interface application may be implemented using any suitable architecture. For example, it may be a stand-alone application wholly implemented on user equipment device 500. In such an approach, instructions of the application are stored locally (e.g., in storage 514), and data for use by the application is downloaded on a periodic basis (e.g., from an out-of-band feed, from an internet resource, or using another suitable approach). Control circuitry 512 may retrieve instructions of the application from storage 514 and process the instructions to generate any of the displays discussed herein. Based on the processed instructions, control circuitry 512 may determine what action to perform when input is received from input interface 502. For example, movement of a cursor on an audio user interface element may be indicated by the processed instructions when input interface 502 indicates that a user interface 211 was selected.

In some embodiments, the vehicle content interface application is a client-server based application. Data for use by a thick or thin client implemented on user equipment device 500 is retrieved on-demand by issuing requests to a server remote to the user equipment device 500. In one example of a client-server based content application, control circuitry 512 runs a web browser that interprets web pages provided by a remote server. For example, the remote server may store the instructions for the application in a storage device. The remote server may process the stored instructions using circuitry (e.g., control circuitry 512) and generate the displays discussed above and below. The client device may receive the displays generated by the remote server and may display the content of the displays locally on user equipment device 500. This way, the processing of the instructions is performed remotely by the server while the resulting displays are provided locally on user equipment device 500. User equipment device 500 may receive inputs from the user or occupant of the vehicle via input interface 502 and transmit those inputs to the remote server for processing and generating the corresponding displays. For example, user equipment device 500 may transmit, via antenna 508, a communication to the remote server indicating that a user interface element was selected via input interface 502. The remote server may process instructions in accordance with that input and generate a display of content identifiers associated with the selected user interface element as described in greater detail with reference to FIGS. 2 and 9. The generated display is then transmitted to user equipment device 500 for presentation to the user or occupant of the vehicle.

In some embodiments, the vehicle content interface application is downloaded and interpreted or otherwise run by an interpreter or virtual machine (executed by control circuitry 512). In some embodiments, the vehicle content interface application may be encoded in the ETV Binary Interchange Format (EBIF), received by control circuitry 512 as part of a suitable feed, and interpreted by a user agent running on control circuitry 512. For example, the vehicle content interface application may be an EBIF application. In some embodiments, the vehicle content interface application may be defined by a series of JAVA-based files that are received and run by a local virtual machine or other suitable middleware executed by control circuitry 512. In some of such embodiments (e.g., those employing MPEG-2 or other digital media encoding schemes), the vehicle content interface application may be, for example, encoded and transmitted in an MPEG-2 object carousel with the MPEG audio of a program.

Figure 6:
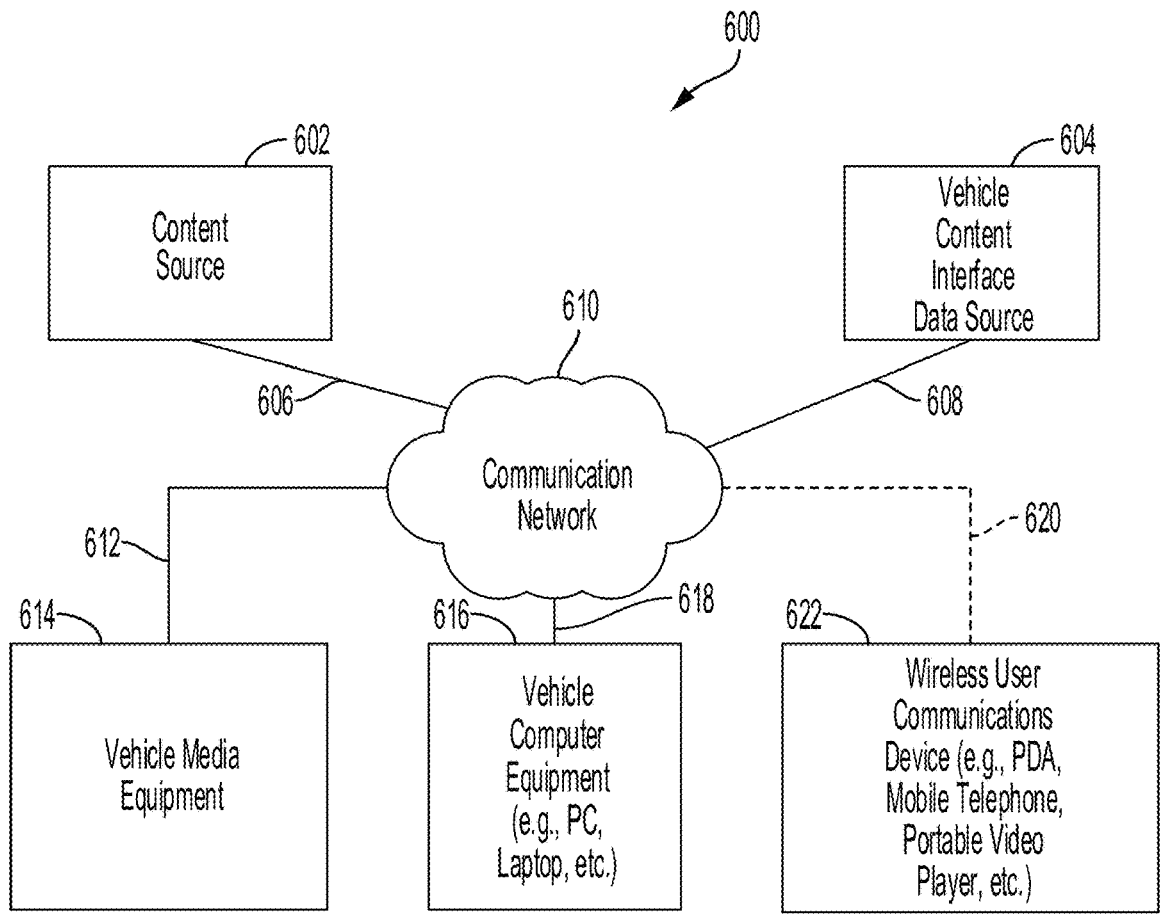
FIG. 6 depicts an example of an illustrative system implementing the user equipment device, in accordance with one embodiment.

User equipment device 500 of FIG. 5 can be implemented in system 600 of FIG. 6 as vehicle media equipment 614, vehicle computer equipment 618, wireless user communications device 622 or any other type of user equipment suitable for accessing content, such as a non-portable gaming machine. For simplicity, these devices may be referred to herein collectively as user equipment or user equipment devices and may be substantially similar to user equipment devices described above. User equipment devices, on which a vehicle content interface application may be implemented, may function as stand-alone devices or may be part of a network of devices. Various network configurations of devices may be implemented and are discussed in more detail below.

A user equipment device utilizing at least some of the system features described above in connection with FIG. 6 may not be classified solely as vehicle media equipment 614, vehicle computer equipment 616, or a wireless user communications device 622. For example, vehicle media equipment 614 may, like some vehicle computer equipment 616, be internet-enabled, allowing for access to internet content, while wireless user computer equipment 622 may, like some vehicle media equipment 614, include a tuner allowing for access to media programming. The vehicle content interface application may have the same layout on various types of user equipment or may be tailored to the display capabilities of the user equipment. For example, on wireless user computer equipment 618, the vehicle content interface application may be provided as a website accessed by a web browser. In another example, the vehicle content interface application may be scaled down for wireless user communications devices 622.

The user equipment devices may be coupled to communication network 610. Communication network 610 may be one or more networks including the internet, a mobile phone network, mobile voice or data network (e.g., a 4G, 5G or LTE network), cable network, public switched telephone network, or other types of communications network or combinations of communications networks.

System 600 includes content source 602 and vehicle content interface data source 604 coupled to communication network 610. Communications with the content source 602 and the data source 604 may be exchanged over one or more communications paths but are shown as a single path in FIG. 6 to avoid overcomplicating the drawing. Although communications between sources 602 and 604 with user equipment devices 614, 618, and 622 are shown as through communication network 610, in some embodiments, sources 602 and 604 may communicate directly with user equipment devices 614, 618, and 622. In some embodiments, communication network 610 may be configured as communication network 120, communication network 220, and communication network 420 of FIGS. 1, 2, and 4, respectively. In FIG. 6, content source 602 may be communicatively coupled to communication network 610 through interface 606; vehicle media equipment 614 may be communicatively coupled to communication network 610 through interface 612, vehicle content interface data source 604 may be communicatively coupled to communication network 610 through interface 608 and wireless user communications device 622 may be communicatively coupled to communication network 610 through interface 620. In some embodiments, interface 612 may be configured as one or more of interfaces 112, 114, and 125 of FIG. 1; and interface 606 may be configured as interface 134 of FIG. 1.

Content source 602 may include one or more types of content distribution equipment including a media distribution facility, satellite distribution facility, programming sources, intermediate distribution facilities and/or servers, Internet providers, on-demand media servers, and other content providers. In some embodiments, content source 602 is configured as an audio content source of systems 100, 200, and 400 of FIGS. 1, 2, and 400. Vehicle content interface data source 604 may provide content data, such as the audio described above. Vehicle content interface application data may be provided to the user equipment devices using any suitable approach. In some embodiments, vehicle content interface data from vehicle content interface data source 604 may be provided to users' equipment using a client-server approach. For example, a user equipment device may pull content data from a server, or a server may present the content data to a user equipment device. Data source 604 may provide user equipment devices 614, 618 and 622 the vehicle content interface application itself or software updates for the vehicle content interface application.

Figure 7:
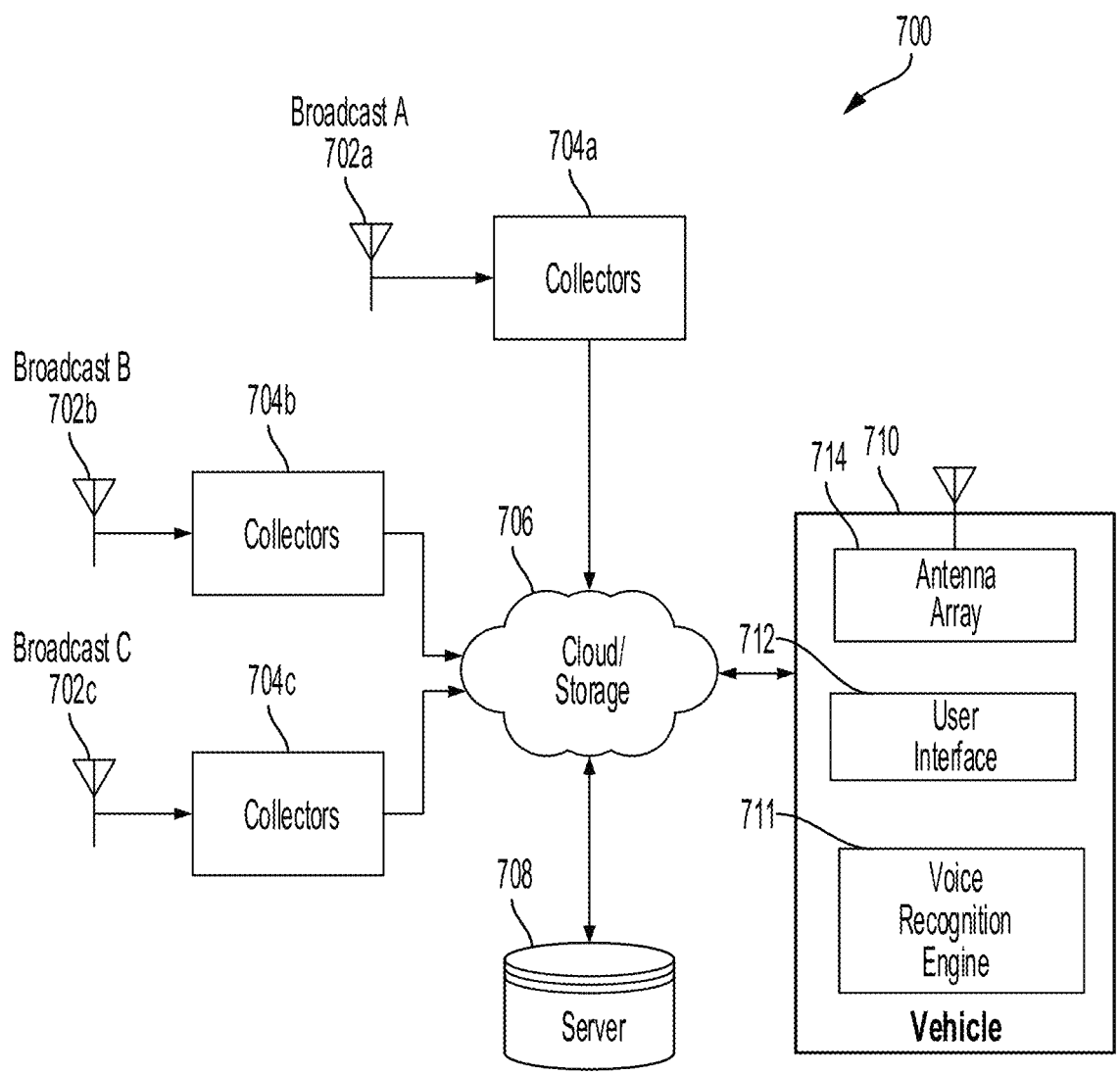
FIG. 7 depicts a block diagram of an illustrative example of a user equipment device, in accordance with one embodiment.

FIG. 7 shows a generalized embodiment of an illustrative system 700 in which user equipment device 500 of FIG. 5 and the system 600 of FIG. 6 can be implemented. System 700 includes an array of antennas (e.g., 702a, 702b, and 702c) connected to collectors (e.g., 704a, 704b, and 704) coupled to storage device 706, server 708 and a vehicle 710. The vehicle 710 can communicate bidirectionally with other systems outside of the vehicle. Communications with the array of antennas (702a, 702b, and 702c) and the collectors (e.g., 704a, 704b, and 704c) and storage device 706 may be exchanged over one or more communications paths but are shown as a single path in FIG. 7 to avoid overcomplicating the drawing.

The array of antennas (e.g., 702a, 702b, and 702c) may include a plurality of antennas dispersed around the country coupled to receive broadcast content items from all terrestrial broadcast content sources. The antennas may be coupled to collectors 704 that collect all of the broadcast content items from broadcast content sources and deliver it to the storage device 706. The broadcast content items are connected to the server 708 for processing for content recognition and geographical origin determination. The broadcast content items are processed through an automated content recognition. The automated content recognition can store, allocate based on content recognition and process for presentation of the broadcast content items. The server 708 may be a collection of servers connected to the storage device for improved processing. The vehicle includes a user interface 712 and an antenna 714 that communicates with the storage device 706. All of the communication between the antennas, collectors, servers and vehicle may be through one or more networks including the internet, a mobile phone network, mobile voice or data network (e.g., a 4G, 5G or LTE network), or other types of communication network or combinations of communications networks for in-vehicle use.

Figure 8:
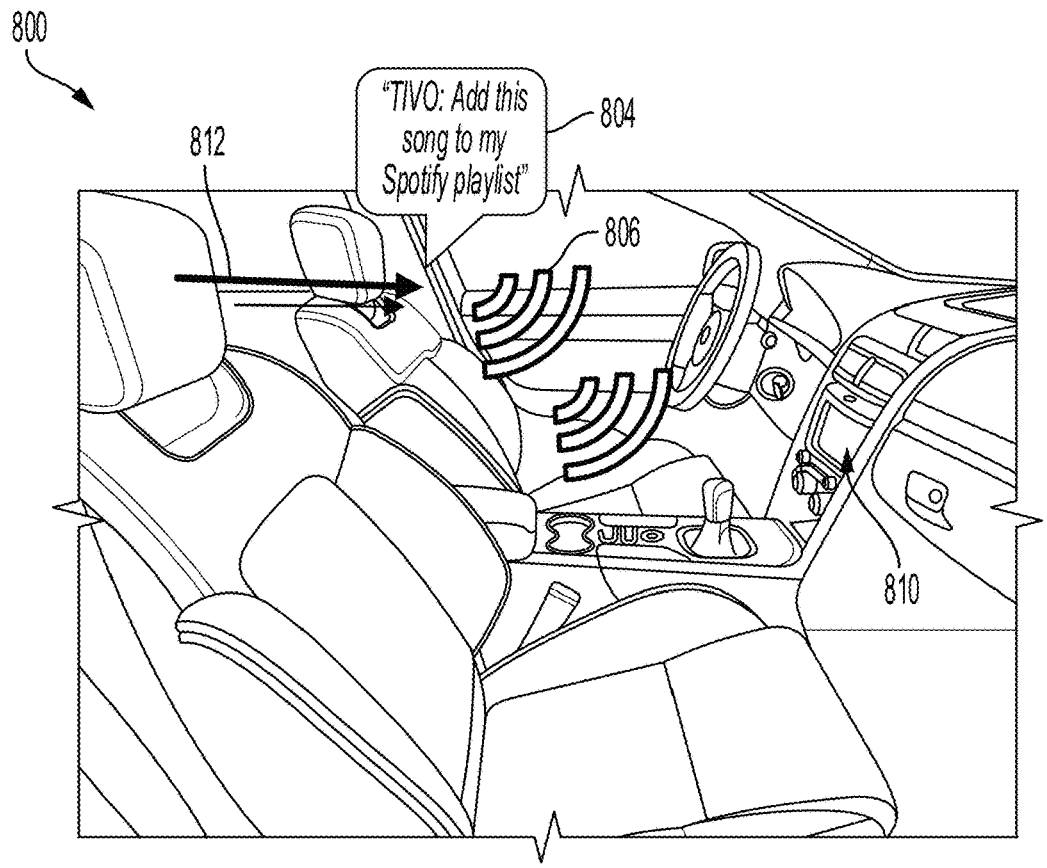
FIG. 8 shows an illustrative diagram of an example vehicle employing an audio playlist generation system, in accordance with some embodiments of the disclosure.

In one embodiment, user equipment may refer to components incorporated into, coupled to, or accessible by a vehicle such as vehicle 800 in FIG. 8. In some embodiments, vehicle 800 is analogous to vehicles 106, 206, or 406 of respective FIGS. 1, 2, and 4. Vehicle 800 need not be configured as vehicles 106, 206, or 406, and may be instead configured as any vehicle suitable for incorporating, coupling or accessing a vehicle entertainment system, as shown and described herein. The vehicle 800 is equipped with a vehicle content interface application that may be further used to enable/disable content options. For example, a user 812 in vehicle 800 may use vehicle content interface component 810 to access content on the vehicle 800. In some embodiments, the vehicle content interface component 810 may be an audio system incorporated into vehicle 800, as discussed earlier with reference to vehicle entertainment systems 110, 210, and 410 of respective FIGS. 1, 2, and 4, or user equipment used to access such content while using vehicle 800.

In an example operation, user 812 utters a command carried by audio signals 806, which are received by vehicle content interface component 810. The uttered user command may be an audio input carried by audio signals 806 to vehicle content interface component 810. In some embodiments, the audio input carried by audio signals 806 analogous to audio input 300 of FIG. 3A and may include audio command trigger 302 and audio playlist command 304. For example, the audio input received from user 812 may be "TIVO: Add this song to my Spotify playlist," as shown at 804 in FIG. 8 and discussed above relative to previous figures.

As discussed above, in some embodiments, a user or occupant of the vehicle 800, such as user 812, may select a user interface 911 as shown in FIG. 9, analogous to user interface 211 (FIG. 2). User interface 911 is incorporated into or accompanying a vehicle content interface component 910 by direct input into the user interface (e.g., activating the system via user interface 911). In some embodiments, vehicle content interface component 910 is configured as vehicle entertainment system 110, 210, and 410 of respective FIGS. 1, 2, and 4. Upon a user's selection of the user interface 911, a list of audio content selections 904, 906, 908, 912, 914 and 916 are displayed on the display screen 900 of vehicle content interface component 910 as shown in FIG. 9. When the user or occupant of the vehicle selects one of the content selectors via the user interface (e.g., user input interface 211 of FIG. 2) incorporated into or accompanying the vehicle content interface component 810, the selected audio content corresponding to the content selector is displayed on the screen.

As discussed above, in some embodiments, to generate a unique playlist, a user interface 911 is displayed on the screen of the vehicle content interface component 810. In one example, a user in the vehicle 800 may select the user interface 911 incorporated into or accompanying the vehicle content interface component 810 by direct input into the user interface (e.g., user interface 911). Upon the user's selection of the user interface 911, a list of audio content selections 904, 906, 908, 912, 914 and 916 is displayed on the display screen 900 as shown in FIG. 9. When the user selects one of the content types 904, 906, 908 via the user interface (e.g., user input interface 911 or user interface 211 (FIG. 2)) incorporated into or accompanying the vehicle content interface component 810, the selected content type corresponds to a content selection displayed on the screen. For example, the user selects the content types 904, 906, and 908 and is prompted to select from a corresponding choice of the content selections. In some embodiments, the user is prompted to select content types for audio content identification 904, third-party service playlist content identification 906, and vehicle playlist content identification 908, corresponding to content selections audio content item 912, third-party service playlist audio content item 5 914, and vehicle playlist audio content item 2 916. The content type and content selection correspond to each other.

When the user selects one of the content identifications 912-916 via the user interface (e.g., user input interface 900 (FIG. 9)) incorporated into or accompanying the vehicle content interface component 810, identifying information of the selected audio content type corresponding to the content selection is displayed on the screen, played via vehicle speakers, or both. For example, in response to the user's selection of identification 904 and the audio content item 912, "Dream On" is played in the vehicle and an album cover from the album including the song "Dream On" is displayed at 916 of user interface 911. In addition to the album cover, other audio content identifiers (e.g., the artist "Aerosmith") may be extracted from the metadata embedded in the song "Dream On" and displayed at 918 of user interface 911, in FIG. 9. Additionally, component 810 may play, or cause to be played, the song "Dream On" in the vehicle. Identifications 906 and 908 are third-party playlist and in-vehicle playlist selections, respectively. For example, user 812 may select identification 906 to direct component 810 to start the process of building a Spotify playlist in accordance with various methods and processes disclosed herein. User 812 may select identification 908 to direct component 810 to start the process of building an in-vehicle playlist, in accordance with various methods and processes disclosed herein.

Figure 10:
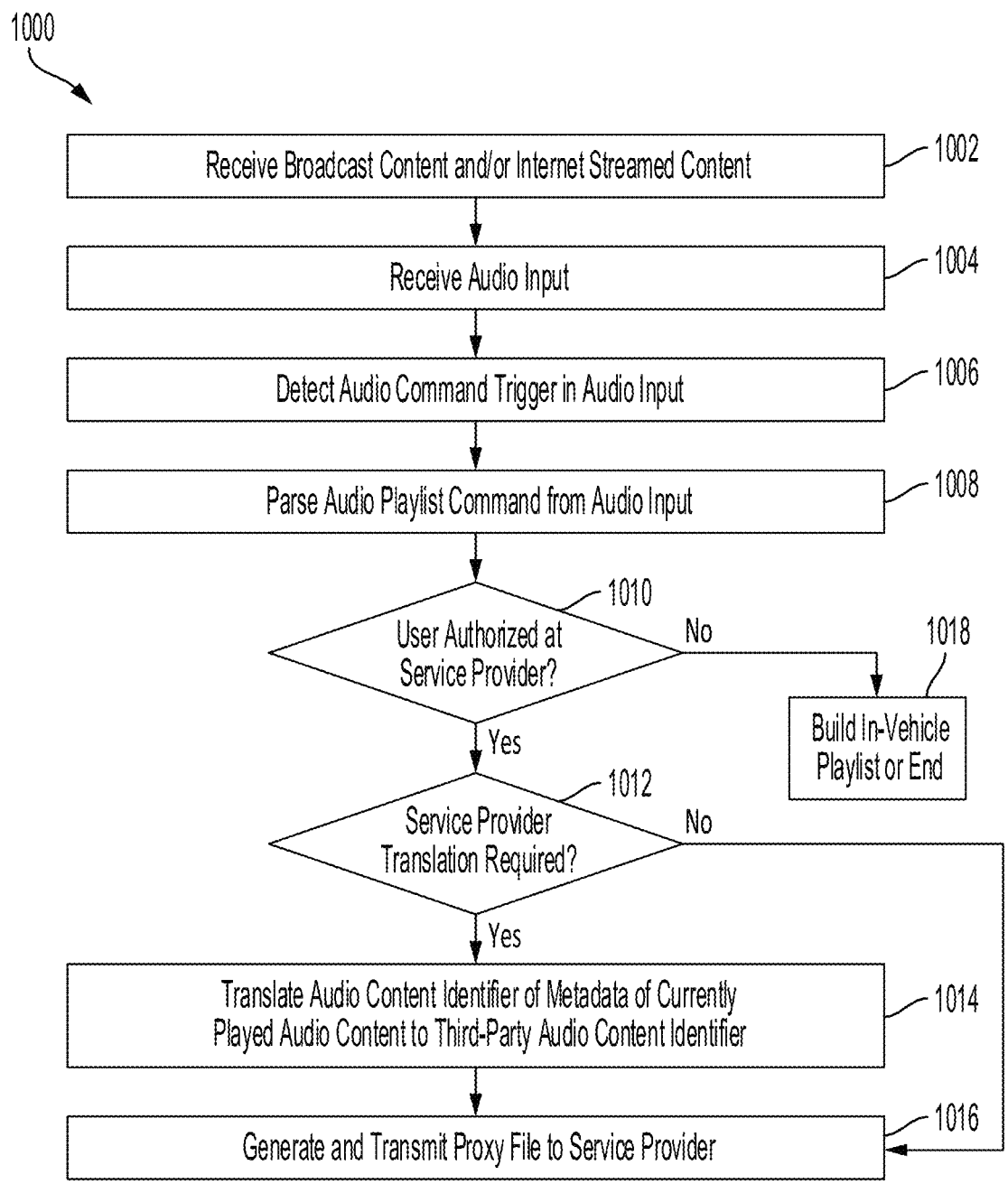
FIGS. 10-11 each depict an illustrative flowchart of an audio playlist generation process, in accordance with some embodiments of the disclosure.

FIG. 10 shows an illustrative flowchart of an audio playlist generation process, in accordance with some embodiments of the disclosure. In FIG. 10, an audio playlist generation process 1000 may be performed by a vehicle entertainment system in a vehicle, such as, without limitation, systems 110, 210, 410, 810, and 910 of respective FIGS. 1, 2, 4, 8, and 9. In some embodiments, the steps of process 1000 may be performed by processing circuitry 510 of FIG. 5 and vehicle media equipment 110 of FIG. 1. In some embodiments, the steps of process 1000 may be performed by any in-vehicle device configured to receive, process, and transmit audio content, audio playlists, and associated identifiers, and to build audio playlists as disclosed herein. In some embodiments, processing circuitry 510 may execute program code stored in storage 514 for carrying out the steps of process 1000. In some embodiments, process 1000 may be implemented, in part or in whole, in hardware. In some embodiments, process 1000 may be implemented by a combination of executing program code and hardware. In the discussion below, process 1000 is presumed performed by execution of program code, for example, processing circuitry 510 executing program code stored in storage 514 (FIG. 5). For simplicity of illustration, vehicle entertainment system 110 of system 100 of FIG. 1 is referenced in the below discussion of process 1000, with interchangeable references to processing circuitry 510 and other components of FIG. 5 to illustrate an example implementation of process 1000. It is understood that while processing circuitry 510 is discussed below to perform the steps of process 1000, other circuitry suitable for carrying out the steps of process 1000 may be employed.

At step 1002, vehicle entertainment system 110 of system 100 receives broadcast audio content and/or internet-generated audio content. For example, processing circuitry 510 executes program code stored in storage 514 to cause speakers 506 to play a particular audio content item in vehicle 106. At step 1004 of FIG. 10, processing circuitry 510 receives audio input. For example, processing circuit 510 may receive audio input 300 of FIG. 3A. At step 1006, processing circuitry detects an audio command trigger in the received audio input of step 1004. For example, at step 1004, processing circuitry 510 may receive the audio input "TIVO: Add this song to my Spotify playlist." At step 1006, processing circuitry 510 detects the word "TIVO" as the audio commandl trigger and therefore expects a playlist action following the audio command trigger. At step 1008, processing circuitry 510 parses the audio playlist command (e.g., "Add this song to my Spotify playlist") from the audio input received at step 1004. In an embodiment, processing circuitry 510 may perform the functions described and shown herein relative to the audio command parser 438 of FIG. 4 to parse the audio playlist command from the audio input, at step 1008. In some embodiments, processing circuitry 510 determines that the audio content item currently playing in the vehicle, for example, vehicle 106, is to be added to or removed from a user or occupant of the vehicle's Spotify playlist, because processing circuitry 510 is programmed to determine, for example, that the word "this" refers to the currently playing audio content item. Processing circuitry may determine "this" refers to the currently playing audio content item by performing a speech detection algorithm suitable for determining the words of the parsed audio playlist command, such as previously described. Processing circuitry 510 further determines that a third-party playlist, namely Spotify's playlist, is to be processed by implementing a suitable speech detection algorithm on the parsed audio playlist command. Accordingly, processing circuitry 510 may confirm the user or occupant of the vehicle with Spotify by confirming the user's account credentials, for example, the username and password, as described relative to user interface 211 of FIG. 2, with Spotify.

At step 1010, processing circuitry 510 confirms with a Spotify-affiliated authentication server, such as server 107, that the user or occupant of the vehicle has an authorized account with Spotify, and the process proceeds to step 1012.

In the event processing circuitry 510 determines that Spotify has not authorized the user account at step 1010, processing circuitry proceeds to step 1018. At step 1018, processing circuitry 510 has an option of ending process 1000 with no playlist built or building an in-vehicle playlist and proceeds accordingly. At step 1018, if the processing circuitry 510 determines to build an in-vehicle playlist, processing circuitry 510 determines an audio content identifier of a metadata of the currently playing audio content item and builds the playlist based on the determined audio content identifier. The option to end the process or to build an in-vehicle playlist may be a matter of a user or occupant of the vehicle's selection. In some embodiments, for example, a user or occupant of the vehicle may select to build an in-vehicle playlist by use of a user interface selection, such as discussed relative to user interface 211 of FIG. 2 and user interface 911 of FIG. 9.

At step 1012, processing circuitry 510 determines a metadata of the audio content item currently playing in the vehicle and further determines an audio content identifier of the metadata, for example, the audio content item's title. Processing circuitry 510 may determine the metadata and the audio content identifier at an earlier step, for example, step 1008. At step 1012, processing circuitry 510 determines whether the third-party service provider (e.g., Spotify) named in the audio playlist command of the audio input has an associated third-party audio content identifier, for example, as discussed with reference to service provider search engine 440 in FIG. 4. In the case where processing circuitry 510 determines the third party has a unique identifier, processing circuitry 510 proceeds to step 1014; otherwise, processing circuitry 510 proceeds to step 1016 and skips step 1014. At step 1014, processing translates the audio content identifier to the unique third-party audio content identifier. For example, processing circuitry 510 may perform the translation of step 1014 as discussed relative to service provider search engine 440 of FIG. 4. At step 1016, processing circuitry 510 generates and transmits a proxy file with either the audio content identifier or the third-party audio content identifier (e.g., an identifier of the song "Dream On" recognizable to Spotify) to the sum of a third-party service, such as Spotify. For example, processing circuitry 510 may transmit the proxy file to server 107 of FIG. 1. In response to receiving the playlist from the third-party server, processing circuitry 510 may display the audio contents of the playlist on a user interface of a vehicle entertainment system of the vehicle, for example, system 110, and/or play the audio contents of the playlist on the vehicle entertainment system, as previously described. In some embodiments, the playlist may be an existing playlist, or it may be a new playlist.

Figure 11:
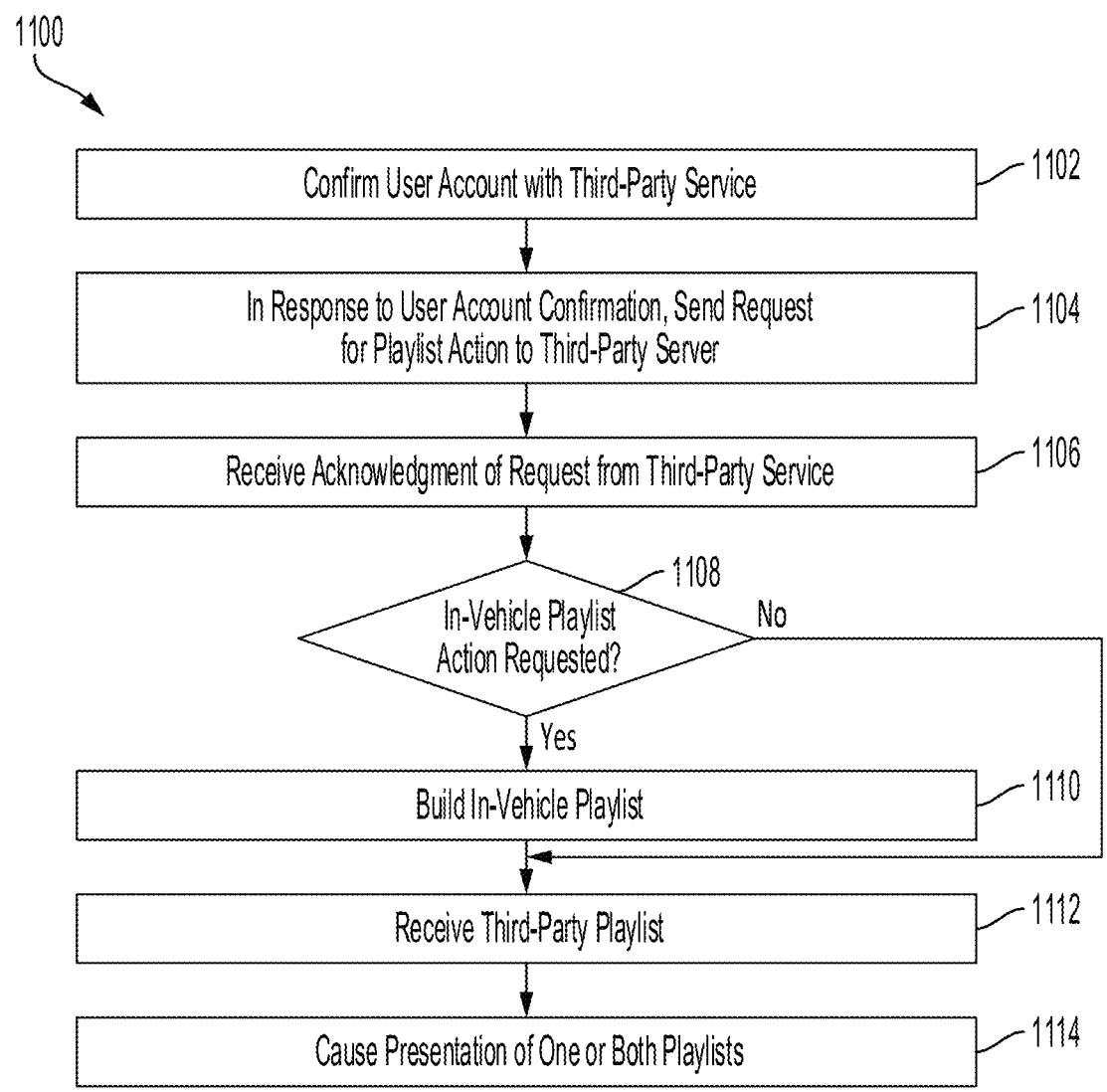

FIG. 11 shows an illustrative flowchart of an audio playlist generation process, in accordance with some embodiments of the disclosure. In FIG. 11, an audio playlist generation process 1100 may be performed by a vehicle entertainment system in a vehicle, such as, without limitation, systems 110, 210, 410, 810, and 910 of respective FIGS. 1, 2, 4, 8, and 9. In some embodiments, the steps of process 1100 may be performed by processing circuitry 510 of FIG. 5 and vehicle media equipment 110 of FIG. 1, for example. In some embodiments, the steps of process 1100 may be performed by any in-vehicle device configured to receive, process, and transmit audio content, audio playlists, and associated identifiers, and to build audio playlists as disclosed herein. In some embodiments, processing circuitry 510 may execute program code stored in storage 514 for carrying out the steps of process 1100. In some embodiments, process 1100 may be implemented, in part or in whole, in hardware. In some embodiments, process 1100 may be implemented by a combination of executing program code and hardware. In the discussion below, process 1100 is presumed performed by execution of program code, for example, processing circuitry 510 executing program code stored in storage 514 (FIG. 5). For simplicity of illustration, vehicle entertainment system 110 of system 100 of FIG. 1 is referenced in the below discussion of process 1000, with interchangeable references to processing circuitry 510 and other components of FIG. 5 to illustrate an example implementation of process 1100. It is understood that while processing circuitry 510 is discussed below to perform the steps of process 1100, other circuitry suitable for carrying out the steps of process 1100 may be employed.

At step 1102, in FIG. 11, the account of a user or occupant of vehicle 106 is confirmed with a third-party playlist service provider. For example, processing circuitry 510 confirms the user account with server 107, as discussed relative to FIG. 2 above. At step 1104, in response to confirmation of the user or occupant account, processing circuitry 510 may send a request to the third-party server for a playlist action. For example, processing circuitry 510 may transmit a request through interface 226 (FIG. 2) to server 107 to add an audio content item to a user or occupant playlist. The processing circuitry 510 may make such a request by providing a third-party audio content identifier that identifies the audio content to be added to the third-party server. At step 1106, processing circuitry 510 receives acknowledgment of the request of step 1104. For example, processing circuit 510 may receive an acknowledgment through interface 228 of FIG. 2 from server 207.

At step 1108, processing circuitry 510 may make a determination as to whether the user or occupant of vehicle 106 is selecting to build the playlist in-vehicle or by a third-party service. Processing circuitry 510 may make the determination of step 1108 in response to a user or occupant selection on a user interface of vehicle entertainment system 110, for example user interfaces 211 and 911 of FIGS. 2 and 9, respectively. In some embodiments, an in-vehicle playlist may be built when a third-party playlist is built, as a default feature, in which case step 1108 may be skipped. If, at step 1108, processing circuitry 510 determines an in-vehicle playlist action is requested, process 1100 proceeds to step 1110; otherwise, process 1100 proceeds to step 1112. At step 1110, processing circuitry 510 builds an in-vehicle playlist based on a user or occupant selection through a user interface of vehicle entertainment system 110 or based on the in-vehicle currently playing or an in-vehicle previously playing audio content. At step 1112, processing circuitry 510 receives a third-party playlist from server 107. In the scenario of FIG. 11, if processing circuitry 510 performs both steps 1110 and 1112, two audio playlists are generated, an in-vehicle audio playlist, created or updated by vehicle entertainment system 110, at step 1110, and an audio playlist created or updated by server 107, at step 1112. The two playlists may or may not be identical. For example, assuming the playlist action at step 1104 is to add an audio content item, the audio content item being added may be the fifth audio content item in the server-provided playlist, whereas the same audio content may be the second audio content item in the in-vehicle playlist, as shown by user interface 911, in FIG. 9. Referring still to FIG. 11, at step 1114, processing circuitry 510 may cause audio contents of one or both playlists to be presented at a display, for example, display 504 (FIG. 5), the display of vehicle entertainment system 110 (FIG. 1), or the vehicle entertainment system 210 (FIG. 2). Processing circuit 510 may also or alternatively play the audio contents of one or both playlists.

It is understood that the order of steps of each of the processes 1000, and 1100, as shown in the flowcharts of FIGS. 10 and 11, respectively, may be suitably changed or exchanged. For example, one or more steps, as may be suitable, can be added to or deleted from each of the processes 1000 and 1100.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of generating a playlist of audio content for a vehicle comprising:
    receiving an audio input at a vehicle entertainment system of the vehicle while an audio content item is currently played by the vehicle entertainment system, wherein the audio input includes an audio command trigger and an audio playlist command;
    in response to detecting the audio command trigger in the audio input, parsing, by the vehicle entertainment system, the audio input to determine the audio playlist command;
    determining, by the vehicle entertainment system, a metadata associated with the audio content item of the audio content by processing the audio content item; and
    in response to determining the audio playlist command, transmitting, by the vehicle entertainment system, a third-party audio content identifier to a remote server causing the audio content to be added to an audio content playlist of a third-party service based on the metadata of the audio content item.

2. The method of claim 1, wherein the audio content is internet-sourced or terrestrially sourced.

3. The method of claim 1, wherein the third-party service is identified in the audio playlist command and wherein the metadata comprises an audio content identifier that identifies the audio content to the vehicle entertainment system, the method further comprising translating the audio content identifier in the metadata to the third-party audio content identifier based on a protocol, wherein the third-party audio content identifier identifies the audio content to a remote server for inclusion in the audio content playlist.

4. The method of claim 3, further comprising storing the audio content identifier in a database located externally and remotely to the vehicle, the database for storing identified audio content for inclusion in a corresponding audio content playlist based on an audio content category.

5. The method of claim 4, wherein the audio content identifier comprises data related to the audio content selected from audio content title, audio content genre, or audio content artist.

6. The method of claim 3, wherein the audio content identifier comprises a song track identification, a key, a playlist parameter, or a combination thereof.

7. The method of claim 1, wherein the audio playlist command identifies the third-party audio service, the method further comprising:
    verifying a user account corresponding to the third-party audio service with a third-party server;
    determining whether to translate the audio content identifier of the metadata to the third-party audio content identifier of the third-party audio service; and
    in response to determining to translate the audio content identifier to the third-party audio content identifier, transmitting a proxy file to the third-party server for adding the audio content to the audio content playlist, wherein the proxy file includes the third-party audio content identifier for identifying the audio content item to be added to the audio content playlist by the third-party server.

8. The method of claim 7, wherein in response to determining to not translate the audio content identifier, transmitting the proxy file with the audio content identifier, wherein the audio content identifier is recognizable to the third-party server as the third-party audio content identifier.

9. A system of generating a playlist of audio content for a vehicle comprising:
    processing circuitry configured to:
        receive an audio input at a vehicle entertainment system of the vehicle while an audio content item is currently played by the vehicle entertainment system, wherein the audio input includes an audio command trigger and an audio playlist command;
        in response to detecting the audio command trigger in the audio input, parse at the vehicle entertainment system the audio input to determine the audio playlist command;
        determine at the vehicle entertainment system a metadata associated with the audio content item by processing the audio content item; and
        in response to determining the audio playlist command, transmit by the vehicle entertainment system a third-party audio content identifier to a remote server to cause the audio content item to be added to an audio content playlist of a third-party service based on the metadata of the audio content item.

10. The system of claim 9, wherein the audio content is internet-sourced or terrestrially sourced.

11. The system of claim 9, wherein the third-party service is identified in the audio playlist command and wherein the metadata comprises an audio content identifier that identifies the audio content to the vehicle entertainment system, wherein the processing circuitry is further configured to translate the audio content identifier in the metadata to the third-party audio content identifier based on a protocol, wherein the third-party audio content identifier identifies the audio content item to a remote server for inclusion in the audio content playlist.

12. The system of claim 11, wherein the processing circuitry is further configured to store the audio content identifier in a database located externally and remotely to the vehicle, the database storing identified audio content for inclusion in a corresponding audio content playlist based on audio content category.

13. The system of claim 12, wherein the audio content identifier comprises data related to the audio content item selected from audio content title, audio content genre, or audio content artist.

14. The system of claim 11, wherein the audio content identifier comprises a song identification, a key, a playlist parameter, or a combination thereof.

15. The system of claim 9, wherein the audio playlist command identifies the third-party audio service, and the processing circuitry is further configured to:
   verify a user account corresponding to the third-party audio service with a third-party server;
   determine whether to translate the audio content identifier of the metadata to the third-party audio content identifier of the third-party audio service; and
   in response to determining to translate the audio content identifier to the third-party audio content identifier, transmit a proxy file to the third-party server for adding the audio content to the audio content playlist, wherein the proxy file includes the third-party audio content identifier for identifying the audio content item to be added to the audio content playlist by the third-party server.

16. The system of claim 15, wherein in response to determining to not translate the audio content identifier, the processing circuitry is configured to transmit the proxy file with the audio content identifier, wherein the audio content identifier is recognizable to the third-party server as the third-party audio content identifier.

* * * * *